US012524819B2

(12) United States Patent
Tse

(10) Patent No.: US 12,524,819 B2
(45) Date of Patent: Jan. 13, 2026

(54) DIGITAL IMAGE ANALYZING SYSTEM INVOLVING CLIENT-SERVER INTERACTION

(71) Applicant: Good Clean Collective, Inc., Toronto (CA)

(72) Inventor: Lily Tse, Toronto (CA)

(73) Assignee: Good Clean Collective, Inc., Toronto (CA)

( * ) Notice: Subject to any disclaimer, the term of this patent is extended or adjusted under 35 U.S.C. 154(b) by 0 days.

(21) Appl. No.: 18/582,478

(22) Filed: Feb. 20, 2024

(65) Prior Publication Data

US 2024/0193704 A1 Jun. 13, 2024

Related U.S. Application Data

(63) Continuation of application No. 18/236,399, filed on Aug. 21, 2023, now Pat. No. 11,908,024, which is a
(Continued)

(51) Int. Cl.
*G06Q 50/00* (2024.01)
*G06F 3/00* (2006.01)
(Continued)

(52) U.S. Cl.
CPC ............ *G06Q 50/01* (2013.01); *G06F 3/005* (2013.01); *G06F 16/00* (2019.01); *G06F 16/51* (2019.01);
(Continued)

(58) Field of Classification Search
CPC ........... G06K 9/00; H04Q 11/04; G06Q 50/00
(Continued)

(56) References Cited

U.S. PATENT DOCUMENTS 8,619,762 B2 * 12/2013 Lee ................... H04Q 11/04
377/69
9,292,565 B2 * 3/2016 Bhagwan ............. G06V 30/224
(Continued)

OTHER PUBLICATIONS

Tse, U.S. Appl. No. 18/236,399, filed Aug. 21, 2023, Notice of Allowance and Fees Due.
(Continued)

*Primary Examiner* — Seyed H Azarian
(74) *Attorney, Agent, or Firm* — Hickman Becker Bingham Ledesma LLP

(57) ABSTRACT

Techniques for scanning physical media on physical items and providing information about those physical items are provided. In one technique, a digital image that is generated by a mobile device and that indicates a list of ingredients in an item is identified. Text that contains the list of ingredients is identified within the digital image. It is determined whether a particular ingredient in the list of ingredients satisfies one or more criteria. In response to determining that the particular ingredient satisfies the one or more criteria, the digital image is modified by causing a portion, of the text within the digital image, that corresponds to the particular ingredient, to be highlighted while the digital image is displayed on a screen of the mobile device. In a related technique, the mobile device performs all the steps, whereas in another technique, a remote server performs one or more of the steps.

26 Claims, 15 Drawing Sheets

Related U.S. Application Data continuation of application No. 17/869,522, filed on Jul. 20, 2022, now Pat. No. 11,734,775, which is a continuation of application No. 17/524,834, filed on Nov. 12, 2021, now Pat. No. 11,436,689, which is a continuation of application No. 16/662,027, filed on Oct. 24, 2019, now Pat. No. 11,200,626, which is a continuation of application No. 14/097,079, filed on Dec. 4, 2013, now abandoned.

(60) Provisional application No. 61/733,495, filed on Dec. 5, 2012.

(51) Int. Cl.
| | | |
|---|---|---|
| *G06F 16/00* | (2019.01) | |
| *G06F 16/51* | (2019.01) | |
| *G06K 9/00* | (2022.01) | |
| *G06Q 30/018* | (2023.01) | |
| *G06Q 30/0207* | (2023.01) | |
| *G06Q 30/0601* | (2023.01) | |
| *G06Q 50/26* | (2012.01) | |
| *G06T 1/00* | (2006.01) | |
| *G06T 1/20* | (2006.01) | |
| *G06T 7/00* | (2017.01) | |
| *G06V 20/20* | (2022.01) | |
| *G06V 20/62* | (2022.01) | |

(52) U.S. Cl.
CPC ....... *G06Q 30/018* (2013.01); *G06Q 30/0207* (2013.01); *G06Q 30/0623* (2013.01); *G06Q 50/26* (2013.01); *G06T 1/0007* (2013.01); *G06T 1/20* (2013.01); *G06T 7/0012* (2013.01); *G06V 20/20* (2022.01); *G06V 20/63* (2022.01)

(58) Field of Classification Search
USPC ........ 382/100, 103, 106, 108, 110, 113, 115, 382/128, 140–141, 149, 168, 180–181, 382/189, 190, 199, 200, 209, 219, 254, 382/275–276, 285, 287, 292, 305, 318; 705/303, 2; 707/769, 17.023, 999.005; 377/769

See application file for complete search history.

(56) References Cited

U.S. PATENT DOCUMENTS

| | | | |
|---|---|---|---|
| 9,619,762 B2 | 4/2017 | Dlott | |
| 10,380,174 B2 * | 8/2019 | Bhagwan | ............ G06F 16/5866 |
| 2002/0125313 A1 | 9/2002 | Broff | |
| 2006/0015536 A1 | 1/2006 | Buchanan | |
| 2006/0083431 A1 | 4/2006 | Bliss | |
| 2006/0173569 A1 | 8/2006 | Kagiwada et al. | |
| 2006/0200480 A1 * | 9/2006 | Harris | .................... G06Q 30/06 |
| 2006/0239545 A1 * | 10/2006 | Tedesco | ........... G08B 13/19673 |
| | | | 707/E17.023 |
| 2009/0063229 A1 | 3/2009 | Coladonato et al. | |
| 2009/0177639 A1 * | 7/2009 | Zerdoun | ................ G06Q 30/02 |
| | | | 707/999.005 |
| 2010/0250463 A1 | 9/2010 | O'Rourke et al. | |
| 2011/0047035 A1 | 2/2011 | Gidwani et al. | |
| 2012/0005105 A1 * | 1/2012 | Beier | .................. G06Q 10/087 |
| | | | 705/303 |
| 2012/0005222 A1 * | 1/2012 | Bhagwan | ............ G06F 16/5838 |
| | | | 707/769 |
| 2012/0123953 A1 | 5/2012 | Jabara | |
| 2013/0085345 A1 | 4/2013 | Geisner et al. | |
| 2013/0149678 A1 | 6/2013 | Tokuda et al. | |
| 2013/0151268 A1 | 6/2013 | Fletcher | |
| 2014/0095479 A1 | 4/2014 | Chang et al. | |
| 2014/0236622 A1 * | 8/2014 | Southam | ................ G16H 20/30 |
| | | | 705/2 |
| 2022/0076355 A1 | 3/2022 | Tse | |
| 2022/0375003 A1 | 11/2022 | Tse | |

OTHER PUBLICATIONS

Tse, U.S. Appl. No. 17/869,522, filed Jul. 20, 2022, Notice of Allowance and Fees Due.
Tse, U.S. Appl. No. 17/869,522, filed Jul. 20, 2022, Non-Final Rejection.
Tse, U.S. Appl. No. 17/869,522, filed Jul. 20, 2022, Final Rejection.
Tse, U.S. Appl. No. 17/524,834, filed Nov. 12, 2021, Notice of Allowance and Fees Due.
Tse, U.S. Appl. No. 17/524,834, filed Nov. 12, 2021, Non-Final Rejection.
Tse, U.S. Appl. No. 17/524,834, filed Nov. 12, 2021, Final Rejection.
Tse, U.S. Appl. No. 16/662,027, filed Oct. 24, 2019, Office Action.
Tse, U.S. Appl. No. 16/662,027, filed Oct. 24, 2019, Notice of Allowance and Fees Due.
Tse, U.S. Appl. No. 14/097,079, filed Dec. 4, 2013, Office Action.
Tse, U.S. Appl. No. 14/097,079, filed Dec. 4, 2013, Final Office Action.
Hodgekiss, Ros, "Announcing a Change of Company Details to Your Customers, Campaing Monitor" dated Sep. 16, 2010, 6 pages.
Good Guide, "My Stuff" Green, Healthy, & Safe Product Ratings & Reviews GoodGuide, https://web.archive.org/web/20130429111147/http:/www.goodguide.com/, retrieved from the internet Jan. 2015, 9 pgs.
Good Guide, "Best Body Wash & Cleanser Ratings" GoodGuide, from the internet https://web.archive.org/web/20130502131116/http:/www.goodguide.com/categories , dated Jan. 21, 2015, 2 pages.

* cited by examiner

 USAGE:
Detergent, Surfactant, Foaming agent

 HEALTH IMPACTS:
Cause cancer. Known human carcinogen, Skin irritation, Eye irritation, Respiratory tract irritation. Can cause cancer due to reactions to other substances and subsequences. Possible human carcinogen.

 SOURCES:
David Suzuki Foundation

 WARNINGS FROM REGULATORY AGENCIES:
Canada Hotlist, Restricted in EU.

SODIUM LAURYL SULFATE    8

*FIG. 2D*

FIG. 11   Badge Button 1110

DIGITAL IMAGE ANALYZING SYSTEM INVOLVING CLIENT-SERVER INTERACTION

CROSS REFERENCE TO RELATED APPLICATIONS, BENEFIT CLAIM

This application claims the benefit as a Continuation of application Ser. No. 18/236,399 filed Aug. 21, 2023; which claims the benefit as a Continuation of application Ser. No. 17/869,522 filed Jul. 20, 2022 now U.S. Pat. No. 11,734,775 issued Aug. 22, 2023; which claims the benefit as a Continuation of application Ser. No. 17/524,834, filed Nov. 12, 2021, now U.S. Pat. No. 11,436,689, issued Sep. 6, 2022; which claims the benefit as a Continuation of application Ser. No. 16/662,027, filed Oct. 24, 2019, now U.S. Pat. No. 11,200,626, issued Dec. 14, 2021, which is a Continuation of application Ser. No. 14/097,079 filed Dec. 4, 2013 (now abandoned); which claims priority to U.S. Provisional Application No. 61/733,495, filed Dec. 5, 2012; the entire contents of each of which are hereby incorporated by reference as if fully set forth herein, under 35 U.S.C. § 120. The applicant hereby rescinds any disclaimer of claim scope in the parent applications or the prosecution history thereof and advise the USPTO that the claims in this application may be broader than any claim in the parent applications.

TECHNICAL FIELD

The present disclosure relates generally to digital image analysis and, more particularly to, leveraging a client device and remote server in implementing the digital image analysis.

BACKGROUND

Due to advances in information technology, modern consumers have come to expect sought-after information at a moment's notice. However, current approaches require a user to open up a browser to a search engine, submit a query, and sift through potentially hundreds of results to locate relevant information, which may need to be gleaned from multiple sources. Current sources lack the comprehensive information about physical items that many users desire. What is needed is an approach to allow users to quickly and easily view relevant information about physical items.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIGS. 2A-2D are screenshots of displays that include detailed information of a physical item, in an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for allowing users to scan physical items and receive information about the scanned physical items, such as information regarding the toxicity (or safeness) of individual items found in those physical items. One technique involves analyzing a digital image that includes information about ingredients in a physical item to identify multiple ingredients of the physical item. A toxicity level or safeness attribute is determined for each identified ingredient. If one of the ingredients is determined to be unsafe or toxic, then the digital image is updated to highlight that ingredient.

Another technique involves generating a rating for a product based solely on toxicity or safety information of ingredients that are found in the product.

Another technique involves using a mobile device's current location to identify potentially relevant product information for a user of the mobile device.

Another technique involves allowing a user to specify which products the user owns or uses and allowing other users to view those products in association with the user.

Examples of personal care products include shampoo, conditioner, make-up (e.g., lipstick, eyeliner, blush), skin lotion, shaving cream, toothpaste, deodorant, antiperspirant, sunscreen, sunblock, cologne, and perfume (and other fragrances).

While the following description includes examples of personal care products, embodiments are not limited to those types of products. Other types of products that a user might scan and receive information regarding include home cleaning products, pet food, and pet grooming products.

System Overview

Figure 1:
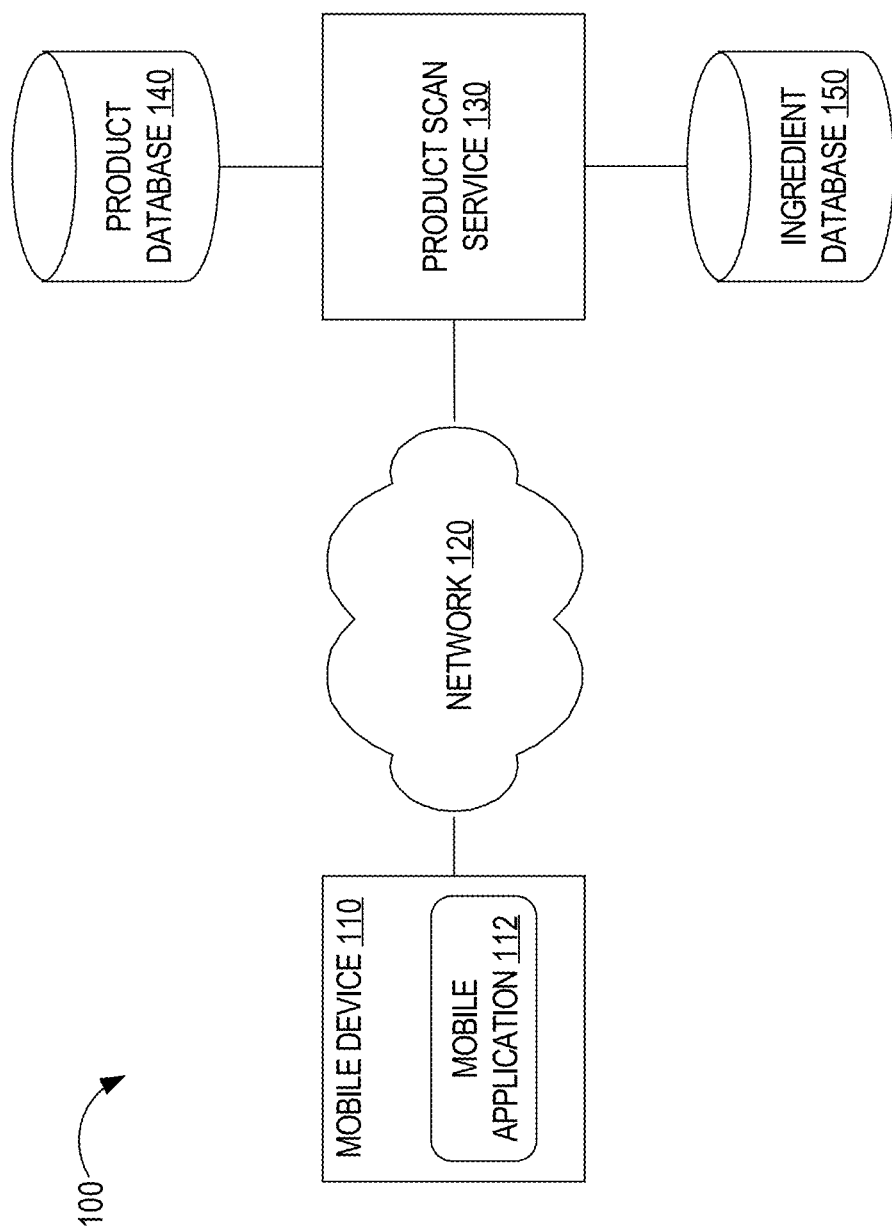
FIG. 1 is a block diagram that depicts a system for allowing users to scan printed media associated with physical items and receive information about the physical items, in an embodiment.

FIG. 1 is a block diagram that depicts a system 100 for allowing users to scan personal care products and receive information about those products, in an embodiment. System 100 includes a mobile device 110, a network 120, a product scan service 130, a product database 140, and an ingredient database 150.

Mobile device 110 is any computing handheld device that may be used to scan a personal care product and display information about ingredients of the product. Examples of mobile device 110 include a tablet computer, a laptop computer, and a smartphone. Mobile device 110 includes an image capturing component, such as a camera, that is configured to generate digital images.

While only one mobile device 110 is depicted, system 100 may include multiple mobile devices that are geographical distributed and that communicate with product scan service 130.

Mobile device 110 includes a mobile application 112 that executes thereon. Mobile application 112 may be configured to communicate with the image capturing component (hereinafter "camera") and instruct the camera to generate one or more digital images. A digital image may be generated in response to user input, such as user selection of a graphical "Scan" button that is generated by the mobile application and that is displayed on a touch-sensitive display of mobile device 110. Alternatively, one or more digital image may be generated automatically as the camera is directed at a personal care product. For example, when it is determined that the camera is in focus, mobile application 112 instructs the camera to take pictures until a bar code is recognized or until ingredients indicated on the personal care product are recognized.

Additionally or alternatively to causing digital images to be generated, mobile application 112 includes bar code reader functionality that is able to recognize and scan a bar code (that comprises a series of lines) and translate the bar code into a series of numbers that is used to uniquely identify a product. The bar code may be on packaging of the product or on a physical display that is adjacent to the product.

Mobile device 110 communicates with product scan service 130 over network 120, which may be a local area network, a wide area network, a packet-switched network (such as the Internet), or any combination thereof.

Although depicted as a single entity, product scan service 130 may be implemented on multiple computing devices and has access to data that is stored locally or remotely relative to the computing device(s) upon which product scan service 130 is implemented. Product scan service 130 may include one or more web servers that are configured to respond to HTTP request and post messages from mobile device 110 (and other mobile devices not depicted). Embodiments are not limited to any particular communication protocol or transport protocol for transmitting data between mobile device 110 and product scan service 130.

Product database 140 stores information regarding multiple products. The information includes a list of ingredients for each product. The information may also include, for each product, brand information (e.g., name and/or identifier), product information (e.g., name and/or identifier, price, weight, etc.), manufacturer name and/or identifier, retailer information (e.g., one or more retailer names and/or identifiers of retailers), and/or one or more product categories (e.g., "shampoo" and/or "hair care"). Product database 140 may be local (i.e., in the same network) or remote (i.e., in a different network) relative to product scan service 130. While product database 140 in FIG. 1 is depicted as a single database, product database 140 may be stored on multiple storage devices.

Ingredient database 150 stores information regarding multiple ingredients that may be found in personal care products. Each ingredient is associated with a safeness attribute (also referred to herein as a "toxicity rating") that indicates whether the ingredient is considered toxic or otherwise unsafe. One or more ingredients may be associated with a safeness attribute that may be mapped to a scale, for example, between '1' and '10,' '10' being extremely toxic or unsafe. Any type of scale may be used to rate an ingredient, such as a numerical scale or a color-coded scale (e.g., "Red" for toxic, "Yellow" for use with caution, and "Green" for safe).

In an embodiment, a toxicity rating between 10-8 indicates that the ingredient has a serious long term health impact; an ingredient rating between 7-4 indicates that the ingredient has a moderate long term impact; and an ingredient rating between 3-0 indicates that the ingredient does not have any concerns.

In an embodiment, ingredient database 150 includes information that indicates how unsafe an ingredient becomes over time. For example, after the expiration date of a product, the toxicity rating of an ingredient found in the product increases from '3' to '5.'

Ingredient database 150 may also include, for each of one or more ingredients, information that identifies "safe" or "unsafe" user characteristics (e.g., age, gender, allergies, medical conditions) that are associated with the ingredient. For example, a particular ingredient may have a toxicity rating of '6' for women but a toxicity rating of '2' for men. As another example, a certain ingredient may have a toxicity rating of '1' for adults and a toxicity rating of '8' for children. As another example, a certain ingredient may have a toxicity rating of '9' for people with eczema and a toxicity rating of '3' for anyone else.

While ingredient database 150 in FIG. 1 is depicted as a single database, ingredient database 150 may be stored on multiple storage devices. Also, product database 140 and ingredient database 150 may be stored on the same storage device(s) or on different storage devices.

In an embodiment, ingredient database 150 (or a portion thereof) is stored on mobile device 110. In this way, mobile device 110 does not have to communicate with product scan service 130 over network 120. Instead, mobile device 110 may operate without any input from product scan service 130. For example, a software package that includes a mobile application that is configured to implement some of the techniques described herein is downloaded, for example, from an "app store." The software package includes an ingredient database and OCR functionality that can recognize ingredients listed in a digital image of an ingredient label of a personal care product.

Ingredient Details

In an embodiment, the impact of ingredient is evaluated under multiple categories. Examples of such categories include (1) carcinogenicity, (2) developmental and reproductive toxicity, and (3) allergies and immunotoxicities. If an ingredient is rated high in each of the multiple categories, then the overall rating of the ingredient is also rated high.

The categorical ratings of an ingredient may be combined in numerous ways, such as calculating an average, identifying the median toxicity rating, or identifying the highest (or most toxic) rating.

A carcinogenicity rating may indicate that an ingredient is a carcinogen, is a tumor promoter, has links to breast cancer, is a known human carcinogen, or is carcinogenic in lab studies.

A developmental and reproductive toxicity rating may indicate that an ingredient is a hormone disruptor, exhibits systemic toxicity, exhibits neurotoxicity, may cause blindness if used near eyes, or interferes with male reproductive health.

An allergy and immunotoxicity rating may indicate that an ingredient is an allergy, triggers asthma, or is toxic to the immune system.

In an embodiment, a computing device (e.g., mobile device 110) displays details about an ingredient, in addition to or alternative to a toxicity rating. Such additional details may include recommended usage of the ingredient (or product that includes the ingredient), sources from which health impacts of the ingredient are studied, third-party certifiers that have certified use of the ingredient (or product that contains the ingredient), and warnings from regulatory agencies.

Figure 2A:
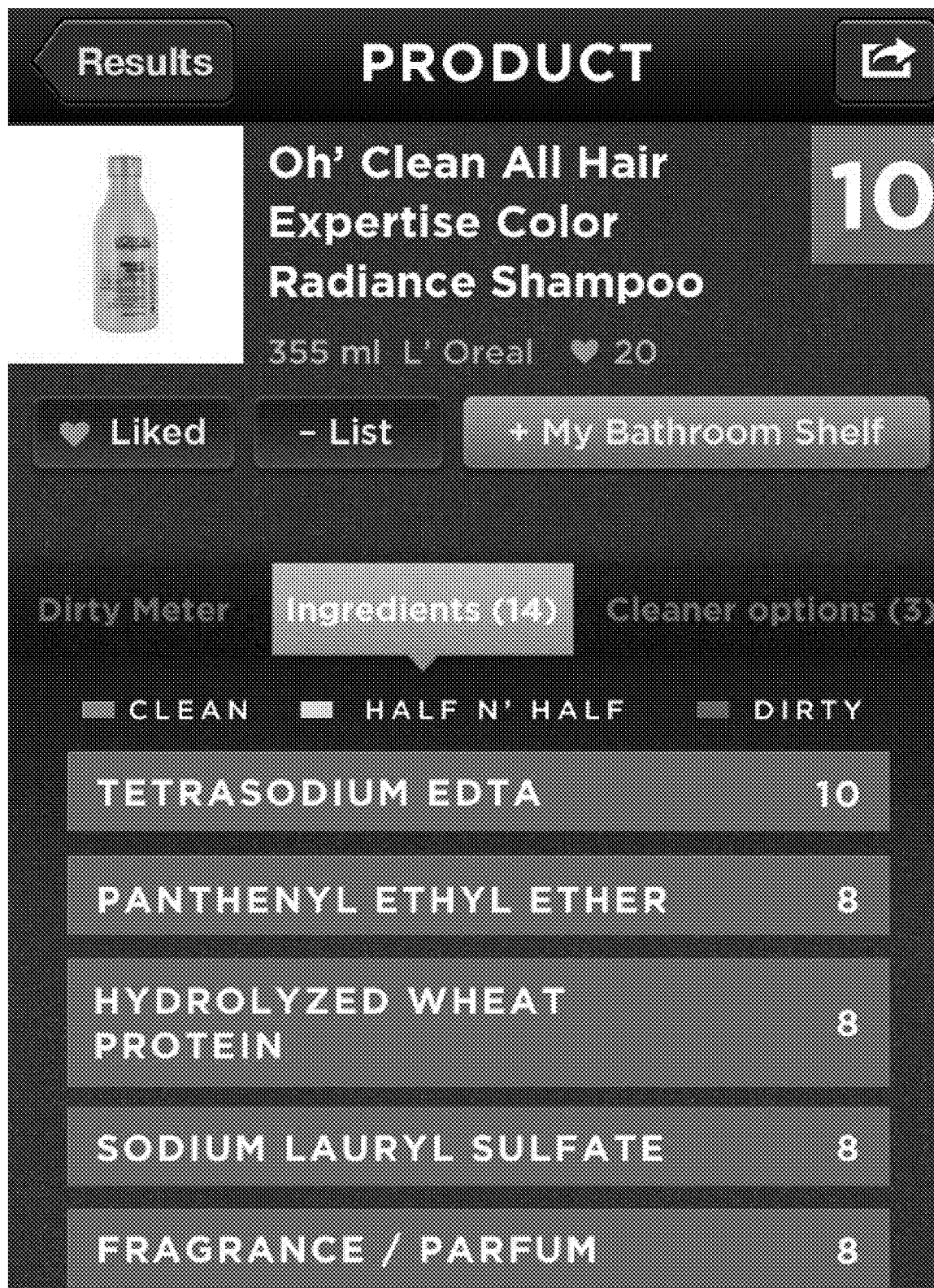
Figure 2B:
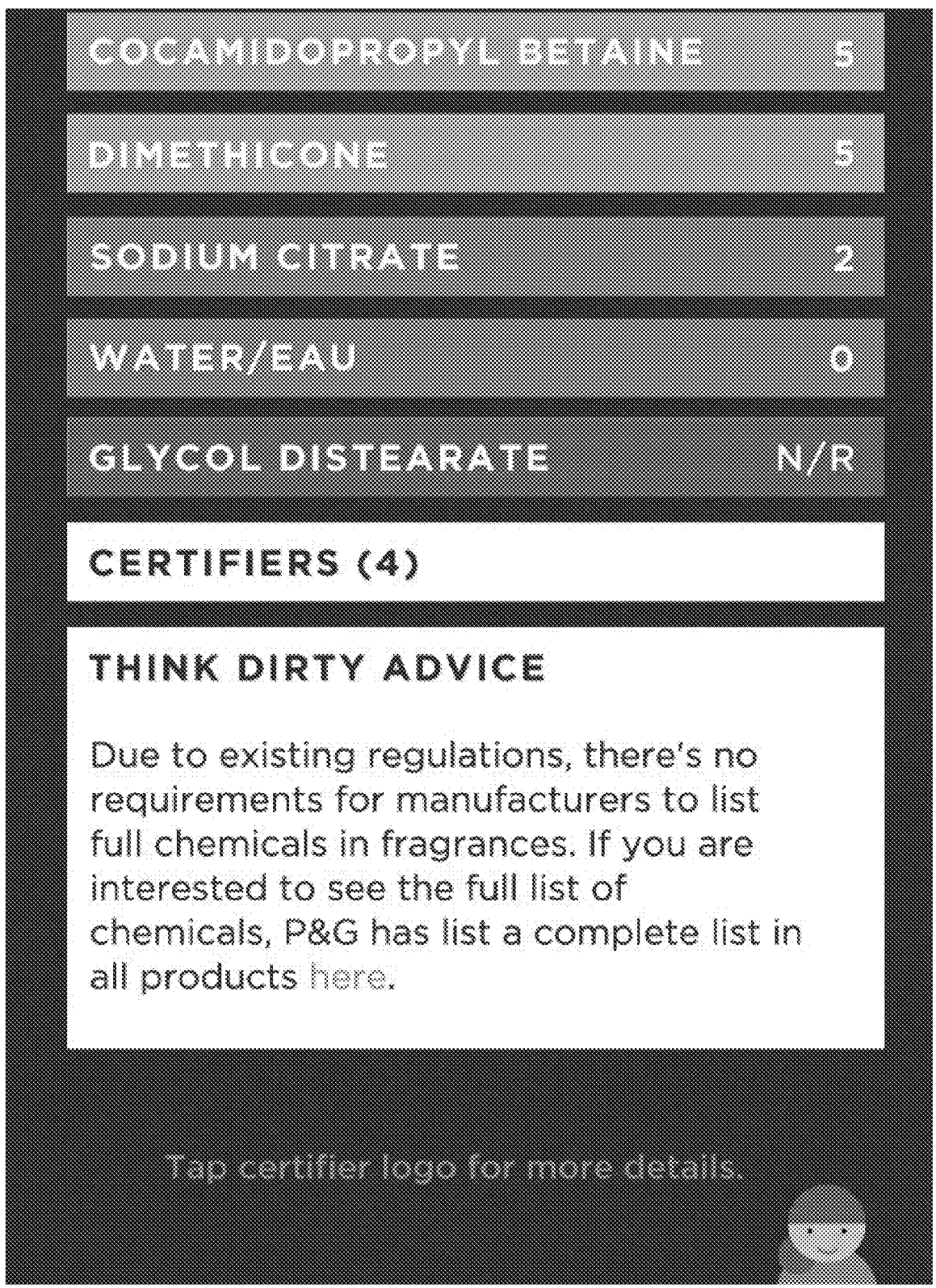
Figure 2C:
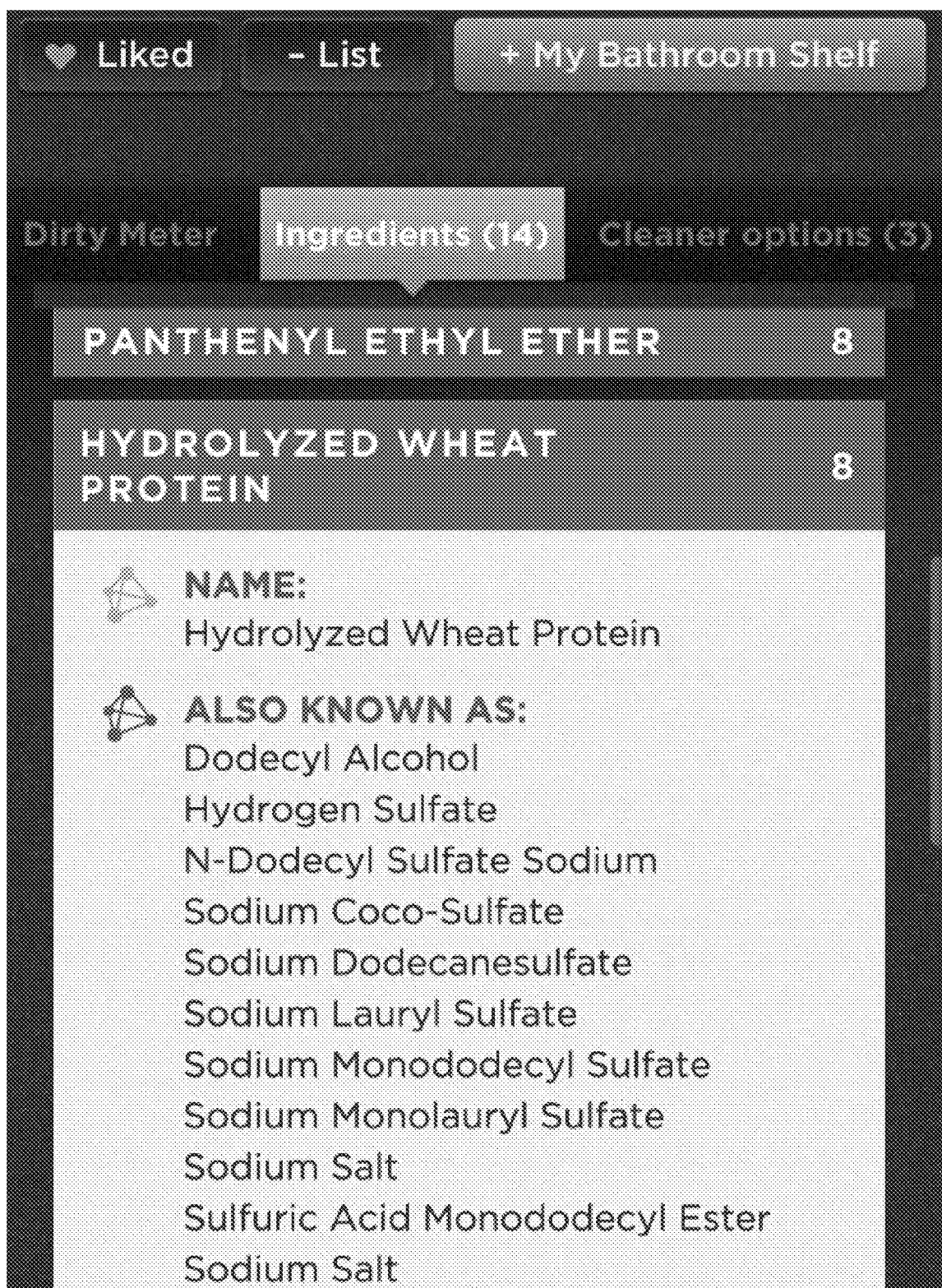

FIGS. 2A-2D are screenshots of displays, provided by mobile application 112 or product scan service 130, that includes detailed information of a product, in an embodiment. FIGS. 2A-2B are two portions of the same screenshot while FIGS. 2C-2D are two portions of a different screenshot.

The screenshot of FIG. 2A indicates a name of a product (i.e., "Oh' Clean All Hair Expertise Color Radiance Shampoo"), an amount of the product (i.e., 355 mL), a brand name of the product (i.e., "L'Oreal"), a number of users who have "liked" the product (indicated by the heart symbol, i.e., 20), an overall safeness rating (i.e., 10), and series of selectable tabs, one of which is "Ingredients (14)." Selection of the "Ingredients (14)" tab causes the list to be displayed. Some of the ingredients are indicated in FIG. 2B. Each ingredient in the list is highlighted based on the ingredient's toxicity rating or safeness attribute. The toxicity rating of each ingredient is also displayed in the same row as the corresponding ingredient.

Another button is entitled "Liked" which, when selected, records data that is stored in association with the user's account and that indicates that the user likes the corresponding product. Selecting the "Liked" button may also cause a message to be sent to mobile devices of other users who are considered "friends" of the user. The message identifies the user and the product that the user "liked."

Another button is entitled "List" which, when selected, allows the user to select from among multiple lists (default or preprogrammed lists provided by product scan service 130 and/or defined by the user) to which the product names will be added. Example list names include "Shampoo", "Hair Care", "Skin Care", and "Makeup." In this way, a user may individually view different lists of products that the user has scanned.

Another button is entitled "Cleaner options (3)" which, when selected, causes information about similar products (e.g., in the same product category) to the currently-displayed product to be displayed. In this example, product scan service 130 has identified three other shampoos that are considered "cleaner" or less toxic. Accordingly, the button includes a "(3)".

Another button is entitled "Results" which, when selected, provides a list of search results that were previously displayed to the user. For example, the user may have submitted a search query through mobile device 110 to product scan service 130, where the search query included the terms "shampoo" and "color." The list of search results included an item for the current product, which item the user selected, which selection may have caused the display of FIG. 2A to be displayed. Thus, selecting the "Results" button may cause the list of search results (or a portion thereof) to be displayed again.

Another button is entitled "My Bathroom Shelf" which, when selected, causes information about the product to be stored in association with data that identifies one or more products as allegedly having been purchased or being used by the user. The user's "Bathroom Shelf" is described in more detail below.

FIG. 2B also includes an option entitled "Certifiers", which, if selected, causes a list of certifiers of the product to be displayed.

FIG. 2C is a screenshot of a display that is generated in response to user input that selects the second ingredient (i.e., "Hydrolyzed Wheat Protein") in the list depicted in FIG. 2A. FIG. 2C indicates a name of the ingredient and alternative names of the ingredient, such as "Dodecyl Alcohol" and "Hydrogen Sulfate." FIG. 2D indicates possible (or recommended) uses of the ingredient, health impacts of the ingredient, sources for at least some of the information found in screenshots 2C and/or 2D, and a warning from a regulatory agency.

Highlighting Toxic Ingredients

In an embodiment, a digital display of a list of ingredients is modified to add highlighting to one or more of the ingredient names based on one or more criteria. The highlighting may be performed while a camera is pointing to a list of ingredients on a personal care product. Alternatively, the highlighting may be performed while the camera is no longer pointing at the list of ingredients. Instead, a digital image of the list is generated and displayed on a screen of mobile device 110 and the digital image does not change while the camera's angle changes.

Examples of the one or more criteria that may be used to determine whether to highlight an ingredient is a toxicity (or unsafe) attribute or rating associated with the ingredient. For example, if a toxicity rating of an ingredient is between '1' and '3' (indicating that the ingredient is relative safe), then the ingredient is highlighted green. If a toxicity rating of an ingredient is between '4' and '6', then the ingredient is highlighted yellow. If a toxicity rating of an ingredient is between '7' and '10' (indicating that the ingredient is relatively unsafe), then the ingredient is highlighted red.

If multiple ingredients are listed in a digital image, then multiple ingredients may be highlighted. For example, one listed ingredient may be highlighted red while another listed ingredient may be highlighted green while another listed ingredient may not be highlighted at all. An ingredient may not be highlighted if the ingredient is well-known (e.g., water) or if an individual rating for the ingredient does not yet exist.

Figure 3:
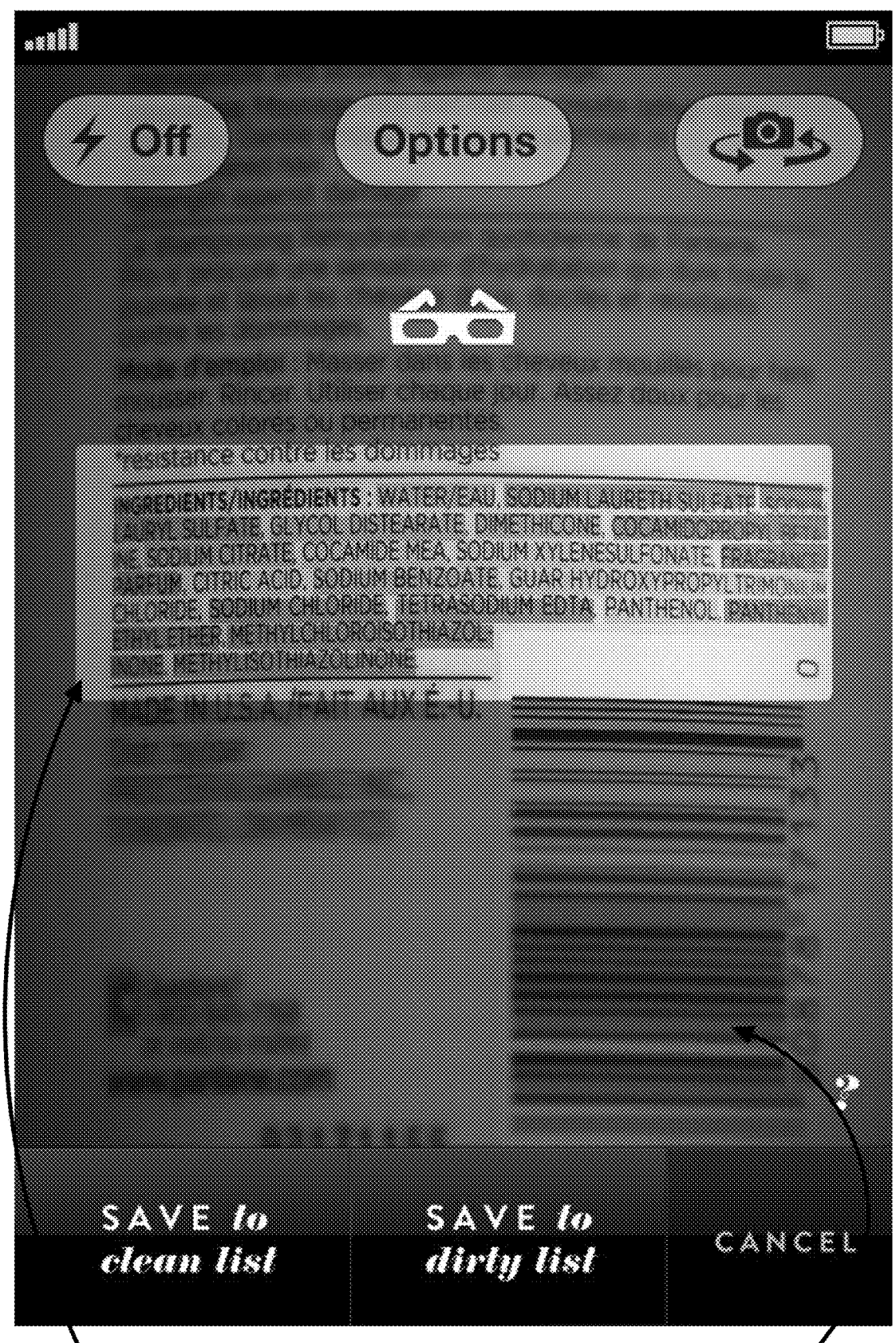
FIG. 3 is a screenshot of a modified digital image that includes highlighting of individual items, in an embodiment.

FIG. 3 is a screenshot of a modified digital image that is displayed on a mobile device, in an embodiment. The digital image is of a product label that includes a bar code 320 and a list of ingredients 310. The digital image has been modified to include a view portion that corresponds to a portion of the digital image that is recognized as including the list of ingredients 310. The remainder of the digital image is darkened in order to draw the user's attention to the list of ingredients 310. The digital image has also been modified to include red, yellow, and green highlighting to multiple ingredient names in the list of ingredients 310. Names of ingredients that are considered toxic or unsafe are highlighted in red; names of ingredients that are considered somewhat unsafe but not too toxic are highlighted in yellow; and names of ingredients that are considered safe are highlighted in green.

The screenshot also includes selectable buttons to allow the list of ingredients and/or product identification data that identifies the product to be stored in a clean list or a dirty list. Such clean or dirty lists may be stored locally on the mobile device and/or remotely by product scan service 130. The respective lists may later be retrieved by the product scan service 110 or by mobile application 112 in response to user input that selects one or both of the lists.

The screenshot also includes an image of 3D glasses that indicates that a user of mobile device may provide input to change the portion of the digital image that is "undarkened." The undarkened portion may be used to assist an OCR component in identifying the portion of the digital image that contains the list of ingredients. The user may change the undarkened portion until the undarkened portion includes all the ingredients. The undarkened portion may also be increased or decreased in size.

In an embodiment, an overall rating of the personal care product is displayed on mobile device 110, where the overall rating is based on individual ratings of multiples ingredients found in the personal care product. The overall rating may be depicted adjacent to or may overlap the image of the list of ingredients. Alternatively, the overall rating may depicted without showing any portion of the image of the list of ingredients. For example, the overall rating may be depicted adjacent to a text description of the personal care product and/or adjacent to a pre-defined image (e.g., from the manufacturer) of the personal care product.

Figure 4:
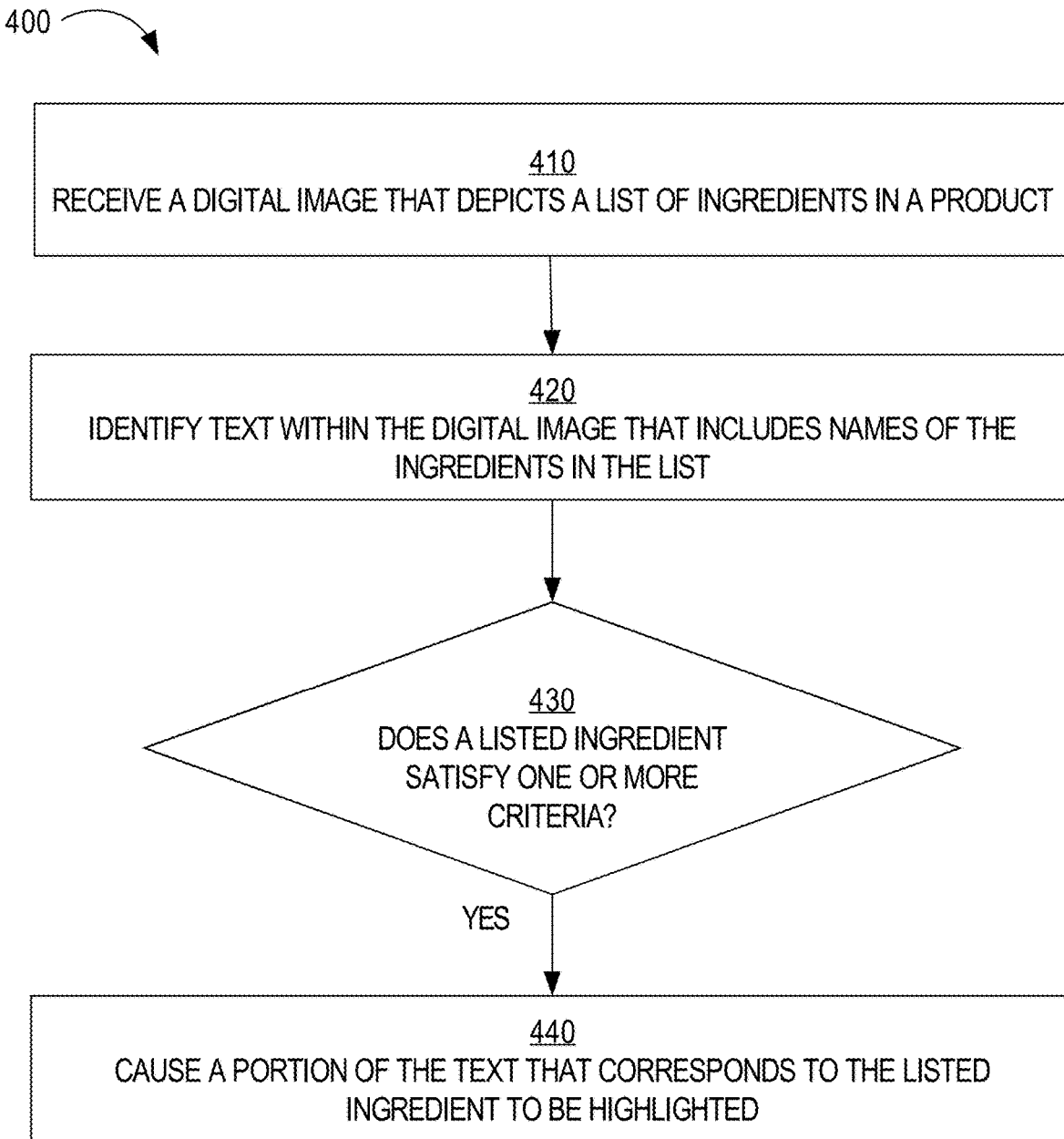
FIG. 4 is a flow diagram that depicts a process for highlighting individual item names in an individual item list, in an embodiment.

FIG. 4 is a flow diagram that depicts a process 400 for highlighting ingredient names in an ingredient list, in an embodiment. Process 400 may be performed by mobile device 110, product scan service 130, or a combination of mobile device 110 and product scan service 130.

At block 410, a digital image that depicts a list of ingredients in a product is received. The digital image is generated by mobile device 110.

At block 420, text that contains the list of ingredients is identified within the digital image. Block 420 may involve using optical character recognition technology to recognize words, names, and commas.

At block 430, in response to identifying the text, it is determined whether one of the ingredients in the list satisfies one or more criteria. As noted previously, the one or more criteria includes a safeness attribute of an ingredient being greater than a particular threshold. For example, if the safeness attribute of an ingredient is greater than '5', then the ingredient satisfies a highlighting criterion.

At block 440, a portion of the text that corresponds to the ingredient is highlighted while the digital image is displayed on a screen of mobile device 110. For example, if the ingredient has a safeness attribute of '9' indicating that the ingredient is very unsafe, then the ingredient name is highlighted red. Block 440 may involve highlighting multiple ingredient names in the digital image. Different ingredient names may be highlighted differently depending their respective safeness attributes.

Geolocation

In an embodiment, mobile device 110 sends, to product scan service 130, geographical data that indicates a geographic location or region in which mobile device 110 currently resides. Product scan service 130 processes the geographical data along with information about a product. Embodiments are not limited to the type of geographical data that mobile device 110 sends or to how mobile device 110 determines the geographical data. For example, the geographical data may include latitude and longitude coordinates or a street address along with city or zip code.

The geographical data may be used by product scan service 130 in multiple ways. For example, the geographical data may be used to identify a physical store in which mobile device 110 is located or to which mobile device 110 is near. Product scan service 130 may have access to geographical store data that associates store locations with their respective geographical locations. Based on identifying a physical store or a merchant associated with the geographical data, product scan service 130 accesses an inventory of the merchant that owns or manages the store. The inventory may be "current" or "stale" in terms of reflecting the actual products that are available at the store or available from another store location of the same merchant or retailer. Thus, product scan service 130 may store or have access to inventory data that associates, for each merchant and/or merchant location, an inventory of personal care products.

Based on the identified inventory that corresponds to the store or merchant location, product scan service 130 identifies one or more personal care products that might be relevant to the user of mobile device 110. For example, product scan service 130 determines one or more personal care products that the user has scanned previously and/or products that the user has purchased previously. Such purchases may be presumed if the user of mobile device 110 has designated certain products as in the user's "Bathroom Shelf", which is a digital record of personal care products that the user has indicated that the user has purchased and used (and/or is currently using). The "Bathroom Shelf" is described in more detail below.

For each of the identified personal care products in the user's "Bathroom Shelf," product scan service 130 may: (1) identify a class (or category) of products that corresponds to the identified personal care product; (2) identify, from the identified inventory, one or more "safe" or "non-toxic" products in the same class; and (3) send, to mobile device 110, product identification data the identifies the "safe" product(s).

Identifying a store's inventory may be initiated in one of multiple ways. For example, a mobile application executing on mobile device 110 may be active and periodically report, to product scan service 130, current geographical data of mobile device 110. As another example, upon entering a store or within a certain distance of the store, a user of mobile device 110 selects an icon of the mobile application or selects a graphical button (e.g., entitled "Show Me Products") displayed by the mobile application on a screen of mobile device 110. As another example, a user of mobile device 110 scans a personal care product while in the store. Thus, scanning the product may initiate the analysis (by product scan service 130) of the store's inventory. Additionally or alternatively to displaying information about which ingredients of the scanned product, if any, are toxic or unsafe, information about related products that are considered safe and that are in the store (as determined based on analyzing the inventory data) are displayed to the user.

In an embodiment, the geographical data of mobile device 110 is used to identify other stores that are geographical near to mobile device 110 and satisfy one or more criteria. The one or more criteria may be a store that sells one or more personal care products that may be relevant to the user of mobile device 110 and that are considered non-toxic or safe. Such relevant products may be products that the user has scanned or purchased previously. Such relevant products may be in a class of products that include other products that the user has scanned or purchased previously. For example, if a user has scanned shampoo X in store A, product scan service 130 determines that store B (which is within 1 mile of store A) sells shampoo Y that is considered less toxic than shampoo X.

In response to identifying the one or more other stores or merchants, store identification data is displayed on mobile device 110, where the store identification data includes a name and, optionally, an address of the one or more other stores. Additionally, product data may be displayed concurrently with the store identification data. The product data may identify a specific personal care product or a class of personal care products that are determined to be relevant to the user and that are sold by the one or more other stores.

Figure 5:
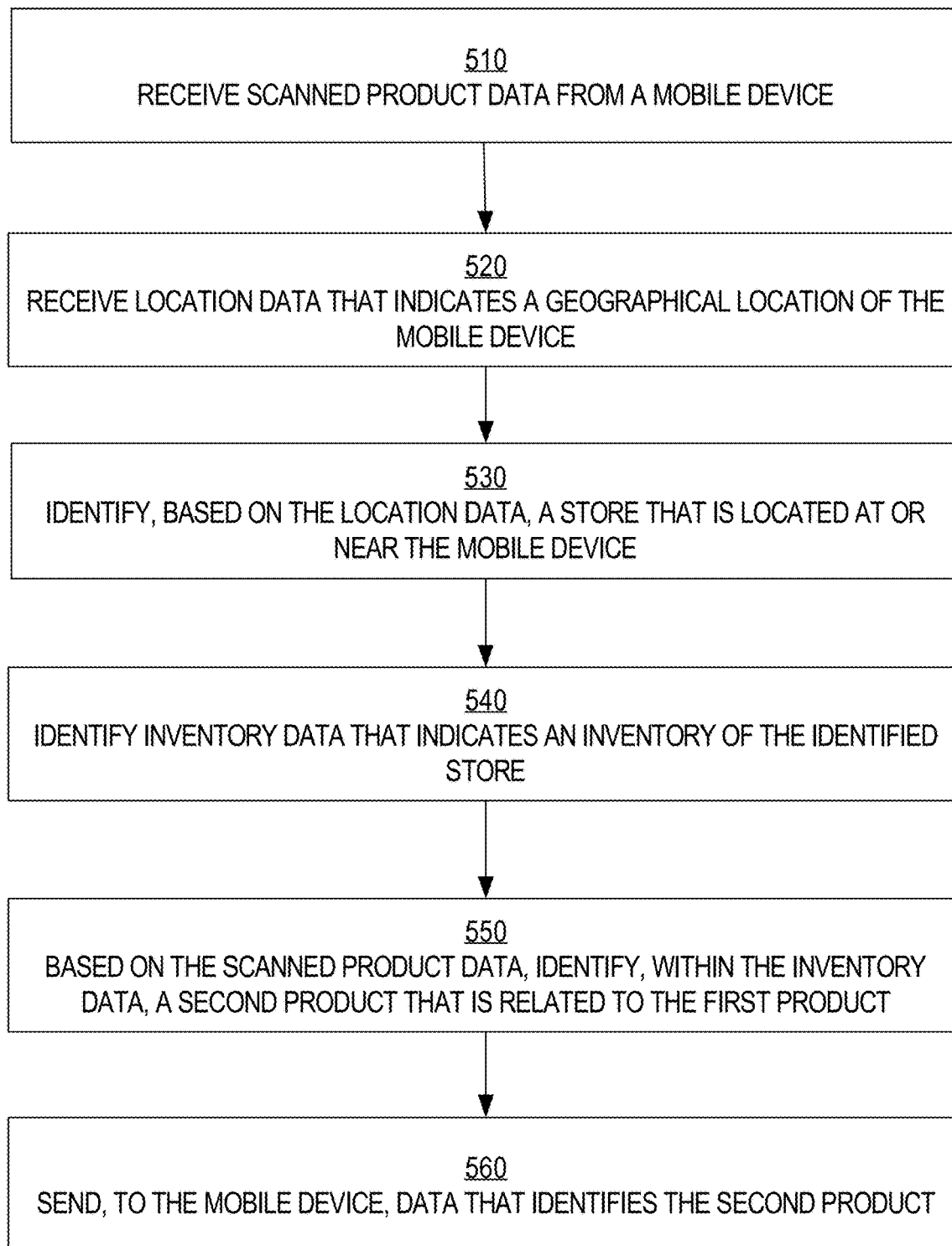
FIG. 5 is a flow diagram that depicts a process for using a mobile device's location to identify potentially relevant physical items, in an embodiment.

FIG. 5 is a flow diagram that depicts a process 500 for using a mobile device's location to identify potentially relevant products, in an embodiment. Process 500 may be implemented by mobile device 110, product scan service 130, or a combination of mobile device 110 and product scan service 130. Also, while process 500 is depicted as occurring in a particular order, process 500 may be performed in a different order.

At block 510, scanned product data is received from a mobile device. The scanned product data may include a bar code associated with a first product, a translation of a bar code, an image of a list of ingredients of the first product, or the actual text of the list of ingredients.

At block 520, location data that indicates a geographical location of the mobile device is received from the mobile device.

At block 530, the location data of the mobile device is used to identify a store that is located at or near the location indicated in the location data. The identified store may be a store in which the mobile device is currently located or a store that is located nearby. If the identified store is different than a store in which the mobile device is currently located, then the identified store may be of the same or different merchant or retailer as the store in which the mobile device is currently located. For example, if a mobile device is in store A of retailer R, block 530 may involve identifying store B of retailer R or store C of retailer S. Alternatively, the mobile device may not be located in any store. For example, the mobile device may be located at the user's residence. Thus, the user may have operated the mobile device to scan a product so that the mobile device can display information about where a store that carries the product or a similar product is located.

At block 540, inventory data that indicates an inventory of the store is identified. The inventory data includes information about multiple products that are sold by the identified store or by the merchant or retailer that owns or manages the store.

At block 550, the scanned product data is used to identify, within the inventory, a second product that is different than the first product. The first and second products may be of the same brand. Alternatively, the first and second products may be of different brands but from the same manufacturer. Alternatively still, the first and second products may be from different manufacturers (although from the same category or class of products).

At block 560, data that identifies the second product is sent to the mobile device. Such data may identify the name, brand, ingredients, price, and/or safeness rating of the second product. If the identified store is different than the store in which the mobile device is currently located, then block 560 may also involve sending information about the identified store, such as a name, an address of the identified store, or a map that indicates a route from the current location of the mobile device to an address of the identified store.

Rating Products

In an embodiment, a personal care product is rated based on one or more of its ingredients. The rating may be based solely on the product's ingredients and not any other factor. For example, if product A has ingredients X, Y, and Z, a rating for product A may be based solely on ingredients X and Z.

A product's rating may be based on multiple individual ingredient ratings. For example, an average is calculated of multiple ratings of ingredients of a product. As another example, a median rating of multiple ingredient ratings of a product may be identified and used as the product's overall rating. As yet another example, the highest rated toxic ingredient in a product may be identified and used as the product's overall rating. For example, if the ratings of ingredients X, Y, Z in product A are, respectively, '2', '9', and '1' (where '10' is the most toxic or unsafe), then the overall rating for product A may be '4' (average), '2' (median), or '9' (highest).

A product rating may be displayed in one of numerous situations. For example, mobile device 110 scans a product (e.g., either a bar code or an ingredient label) and sends scanned data to product scan service 130. If the scanned data is a bar code, then product scan service 130 determines, based on product database 140, a product that is associated with the bar code. Not only may product database 140 include ingredients for multiple products, product database 140 may also store ratings for multiple products. Thus, product scan service 130 may retrieve a product rating from product database 140. Alternatively, product scan service 130 may identify the ingredients associated with the identified product and identify, from ingredient database 150, a toxicity rating (or safeness attribute) for each identified ingredient. Product scan service 130 then calculates an overall product rating based on the individual toxicity ratings.

By calculating a toxicity rating for a product based solely on ingredient ratings of the product, the toxicity rating acts as an authentic representation of the safeness of the product to a user's health. Thus, corporate consumer relation efforts (such as "greenwashing") by the product's manufacturer will not compromise an accurate representation of the product's safeness.

In an embodiment, recall information about a product and/or class action lawsuit information is incorporated into the product's rating. Recall information may come from the Federal Drug Administration (FDA) or Health Canada. Recall information indicates that a particular product has been recalled and may reflect a potential safety issue for consumers. Lawsuit information indicates that a group of consumers have brought a lawsuit (for example, against a product's manufacturer) regarding the safeness of the product or of a product with the same brand. Recall information and lawsuit information may be useful for multiple reasons. For example, a manufacturer of a product may not list all the ingredients on the product's ingredient label. As another example, while the individual ingredients of a product are considered to be safe, a certain combination of two or more ingredients may not be and such a combination was not considered (previous to a recall or class action lawsuit) to be a toxic combination by product scan service 130. Thus, one way to determine a product's safeness is by leveraging recall information or class action lawsuit information, which may be for a different product than the product that is being rated for safeness. In other words, recall and class action lawsuit information may act as a proxy for a product's safeness.

As an example of modifying a product's rating, a recall of a particular product may add three points to the particular product's toxicity rating, while a recall of another product of the same brand may add one point to the particular product's toxicity rating. Similarly, a class action lawsuit may add two points to a particular product's toxicity rating, while a class action lawsuit of another product of the same brand may add 0.5 points to the particular product's toxicity rating. In an embodiment, if a recall or class action lawsuit is associated with a product, then information indicating such an event is included along with ingredient information, such as in an ingredient page similar to the page depicted in FIG. 2A-2B.

Figure 6:
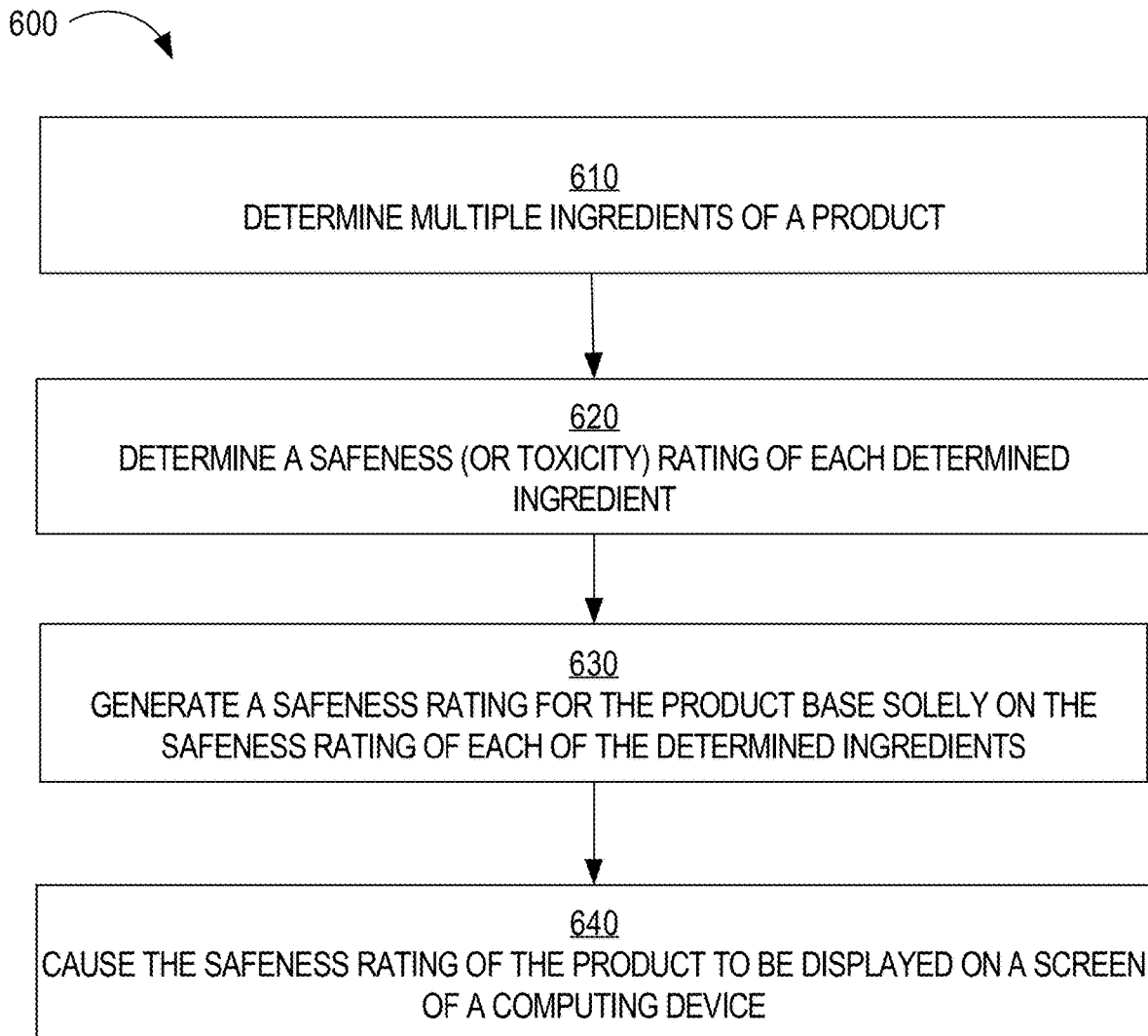
FIG. 6 is a flow diagram that depicts a process for rating a physical item, in an embodiment.

FIG. 6 is a flow diagram that depicts a process 600 for rating a product, in an embodiment. Process 600 may be performed by mobile application 112, by product scan service 130, or both.

At block 610, multiple ingredients of a product are determined. Block 610 may be performed by analyzing a bar code and looking up the ingredients based on bar code in product database 140 or by performing an OCR operation on a digital image of a list of ingredients.

At block 620, a safeness (or toxicity) rating of each ingredient is determined. Block 620 may be performed by analyzing ingredient database 150 for each ingredient identified in block 610.

At block 630, a safeness rating is generated for the product based solely on the safeness attribute of each determined ingredients.

For products in which a safeness rating has already been generated, the safeness rating may be stored in product database 140. Thus, after the safeness rating for a product has been determined, blocks 620-630 may be unnecessary for subsequent determinations of the product's safeness rating.

At block 640, rating data that indicates the safeness rating is displayed on a screen of mobile device 110. Block 640 may be performed by product scan service 130 sending the rating data to mobile device 110 and mobile application 112 causing the rating data to be displayed. The rating data may also be displayed with data that identifies the product. An example of rating data is the '10' rating in FIG. 2A.

Bathroom Shelf

In an embodiment, a user of mobile device 110 identifies personal care products as belonging to the user's "Bathroom Shelf", which is a digital record associated with the user and identifies one or more personal care products that the user has used and/or is currently using. A user may add or remove items from the user's "Bathroom Shelf."

In an embodiment, a user of a mobile application executing on mobile device 110 has a "Bathroom Scan" mode that the user selects prior to scanning one or more items that the user alleges s/he owns. If the mobile application is not in "Bathroom Scan" mode, then the mobile application may be in an "Inquiry" mode. In the "Inquiry" mode, any scans performed by the mobile application are presumed to be of products that the user has not purchased and the user primarily desires to view ingredient information of the product. Thus, while product scans in "Bathroom Scan" mode cause information about the scanned products to be stored in association with data that identifies the scanned products as belonging to the user, products scans in "Inquiry" mode do not.

Additionally, a different data flow may be used while the mobile application is in "Bathroom Scan" mode than while in "Inquiry" mode. For example, while in "Bathroom Scan" mode, in response to scanning a product (e.g., an ingredient list of the product or a bar code of the product), the mobile application may provide a confirmation that the product was successfully scanned (e.g., the ingredients or bar code was recognized) without providing information about any of the ingredients. (The mobile application (or product scan service 130) causes data that identifies the product to be stored in association with data that identifies one or more products as being owned by the user of the mobile application.) Instead, the mobile application may still be in a state that is ready to scan another product. For example, a button may be automatically displayed that, when selected, causes a product to be scanned. As another example, the mobile application may cause a camera of mobile device 110 to be enabled and the mobile application be configured to recognize a bar code or an ingredient list. In this way, the mobile application may scan multiple products without requiring more than one user input per product scan.

In contrast to "Bathroom Scan" mode, a mobile application, while in "Inquiry" mode, causes information to be displayed about one or more ingredients contained in a product in response to each product scan. For example, toxicity or safety information is displayed for one of the ingredients of the scanned product. As another example, a list of ingredients that are found to be in the scanned product is initially displayed. In order to scan another product, the user must provide additional input (e.g., one or more voice commands or one or more button selections) to the mobile application.

Data that identifies a user's "Bathroom Shelf" may be stored on the user's mobile device or remotely from mobile device 110 (e.g., in a local network of product scan service 130) or both.

Figure 7:
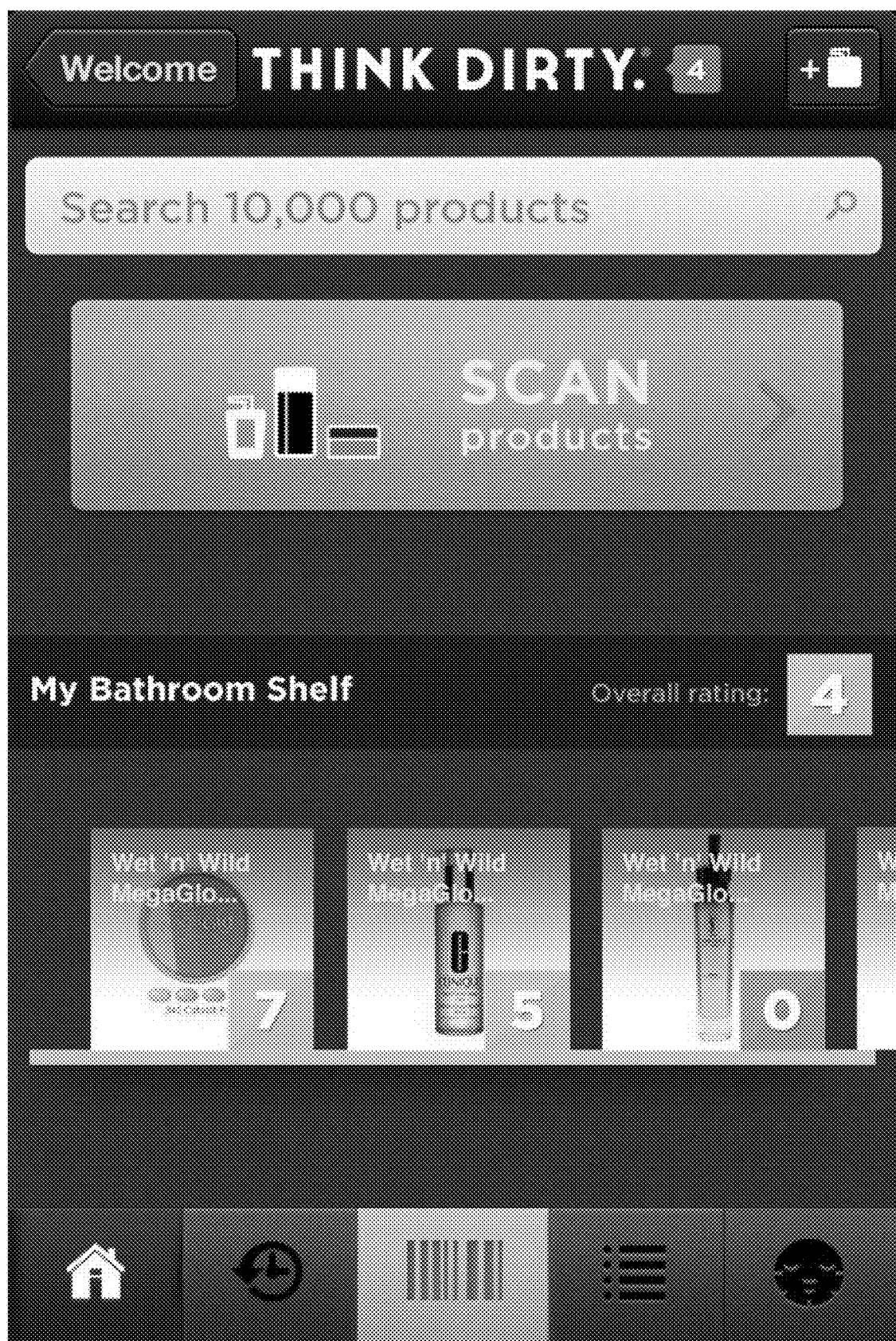
FIG. 7 is a screenshot of a display, on a screen of a mobile device, that indicates information about a user's set of physical items, in an embodiment.

FIG. 7 is a screenshot of a display, on a screen of a mobile device, that indicates information about a user's "Bathroom Shelf," in an embodiment. The screenshot identifies at least three products that the user alleges s/he owns or uses. Each product has a toxicity rating (i.e., '7', '5', and '0' in this example). The screenshot also indicates an overall rating of the user's "Bathroom Shelf", which is '4' in this example. The screenshot also includes a "Scan Product" button that, when selected, causes mobile application 112 to be in a state that is ready to read a bar code or take a picture. The screenshot also includes a search field that allows a user to enter text that can be used to search for products whose names, brand names, manufacturer names, descriptions, and/or ingredients match the text, at least partially.

The bottom of the screenshot of FIG. 7 includes five buttons, one of which includes an icon of a house (i.e., a "home" icon). Those five buttons may be on all, most, or at least some of the pages displayed by mobile application 112 (and, optionally, provided by product scan service 130).

Thus, regardless of what content is displayed, if a user selects the "home" icon, then content of the type displayed in the screenshot of FIG. 7 is displayed.

The middle "bar code" button, when selected, may cause bar code functionality of mobile application 112 to be enabled to allow mobile device 110 to scan a bar code.

The second button from the right, when selected, may cause different lists to be displayed. For example, a user-defined dirty list and a user-defined clean list may be displayed (and not necessarily any items in the lists). Additionally or alternatively, other lists may be displayed, such as different product category lists, some of which may be default lists and some of which may be user-defined lists.

Viewing Others User's Scanned Products

In an embodiment, a user is able to view scanned products of one or more other users' scanned products. For example, a user is allowed to view another user's "Bathroom Shelf." Thus, one user's "Bathroom Shelf" may be viewable by one or more other users. A "Bathroom Shelf" of a particular user may be public in that any user that is registered with product scan service 130 can view the particular user's "Bathroom Shelf." Alternatively, a "Bathroom Shelf" of a particular user may be or semi-public in that only certain users are allowed to view the particular user's "Bathroom Shelf."

In an embodiment, a user provides, to product scan service 130, input (e.g., via mobile device 110) that indicates who can or cannot view the user's "Bathroom Shelf." For example, the user sends, to product scan service 130, invitation data that indicates one or more other users who the user wants to invite to join product scan service 130. The invitation data for each invited user may be an email address or a social network identifier (ID) that uniquely identifies the invited user. In response, product scan service 130 sends an invitation to each of the one or more invited users. Such an invitation may be in the form of an email or a message that is sent to a social network account of the invited user.

If an invited user agrees to join or register with product scan service 130, then product scan service 130 determines that the inviting user invited the invited user and updates friend data that is associated with the inviting user. The friend data is updated to include data that identifies the invited user. Product scan service 130 may send, to a (e.g., mobile) device of the invited user, data that indicates that the invited user is a friend of the inviting user.

After the friend data of the inviting user is updated, the invited user is allowed to view the "Bathroom Shelf" of the inviting user. For example, a mobile application of the invited user may display an icon that represents friends of the invited user. Upon selection of the icon, the mobile application lists one or more friends of the invited user. Upon selection of text or an image that represents a particular friend, the mobile application displays information about items, of the particular friend, that are indicated in the particular friend's "Bathroom Shelf."

Figure 8:
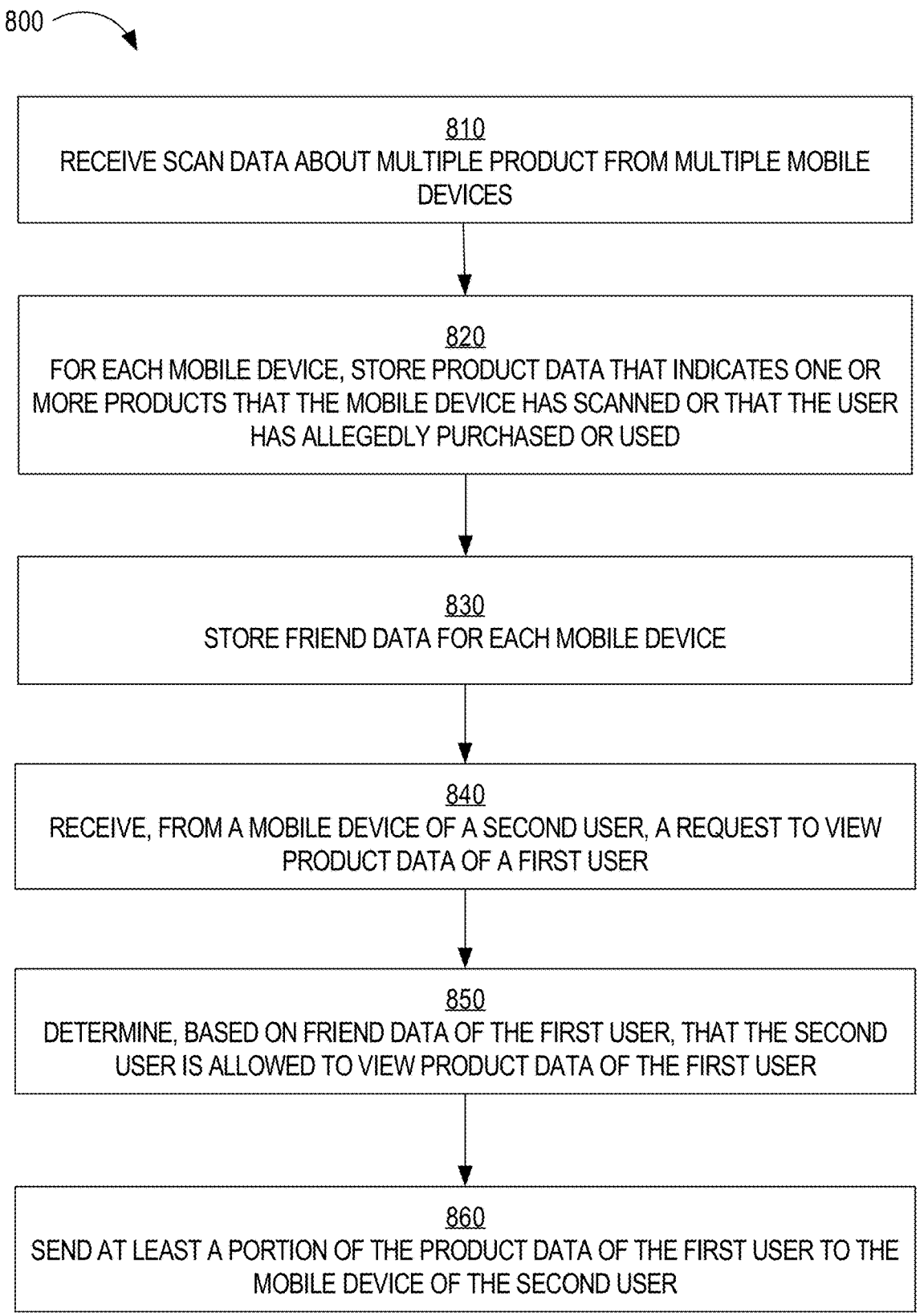
FIG. 8 is a flow diagram that depicts a process for sharing one user's set of physical items with another user, in an embodiment.

FIG. 8 is a flow diagram that depicts a process 800 for sharing a user's "Bathroom Shelf" with another user, in an embodiment. Process 800 may be performed by product scan service 130.

At block 810, scan data is received from multiple mobile devices. The scan data may comprise images of a bar code, numbers represented by scanned bar codes, and/or images of ingredient lists. In other words, product scan service 130 receives (1) first scan data from a first mobile device regarding one or more first products and (2) second scan data from a second mobile device regarding one or more second products.

At block 820, product data is stored for each mobile device (or user thereof). The product data for each mobile device or user indicates a set of products that have been scanned by the mobile device or allegedly purchased or used by the user. The product data for a user may be considered the "Bathroom Shelf" of that user.

At block 830, friend data is stored for each user or mobile device. The friend data of a particular user indicates one or more other users that are allowed to view the product data of the particular user.

At block 840, a request to view the product data of a first user is received from a mobile device that is associated with a second user that is different than the first user.

At block 850, in response to receiving the request, it is determined, based on the friend data of the first user, that the second user is allowed to view the product data of the first user. Alternatively, this determination may be based on friend data of the second user. In other words, in this embodiment, friend data for a particular user indicates one or more other users whose "Bathroom Shelves" are viewable by the particular user.

At block 860, in response to determining that the second user is allowed to view the product data of the first user, at least a portion (or subset) of the product data of the first user is sent to the mobile device of the second user. For example, product scan service 130 sends, to a mobile device (e.g., mobile device 110) of the second user, data that identifies products X, Y, and Z, each of which is identified in the first user's "Bathroom Shelf". Additionally, data that identifies an overall toxicity rating of the first user's "Bathroom Shelf" may be sent to the mobile device of the second user. The mobile device may then display ingredient details (similar to the content depicted in FIGS. 2A-2B) if the second user selects an option that corresponds to one of the first user's scanned or purchased products.

In an embodiment, a user may request to view "Bathroom Shelves" of multiple users simultaneously. In response, product scan service 130 may verify that the user is a friend of each of the multiple users, determine an overall toxicity rating of each user's "Bathroom Shelf," and then send the toxicity ratings to a mobile device of the user to be displayed concurrently.

In an embodiment, a friend of one or more users submits a challenge to the one or more users to reduce the overall toxicity level of the users' "Bathroom Shelves." Product scan service 130 may first verify that the friend is a friend of each of the one or more users and then send, to a mobile device of each of the one or more users, challenge data that indicates the challenge. Each user, upon viewing the challenge, may be incentivized to remove the more toxic products from the user's "Bathroom Shelf" and replace those products with safer alternatives.

Submitting New Information

At times, a product or ingredient is not known to product scan service 130. For example, product scan service 130 receives, from mobile device 110, image data that represents a bar code or an ingredient that is not recognized by product scan service 130 or that is not reflected in product database 140.

In an embodiment, in response to a determination that product scan service 130 does not recognize a bar code or an ingredient, product scan service 130 stores new product/ ingredient data that associates (1) a user or mobile device that transmitted the image data with (2) data that identifies the bar code or ingredient that was not recognized by product scan service 130. Later, when product scan service 130 stores information (a) that associates the previously unknown bar code with a particular product with known ingredients or (b) that associates the previously unknown ingredient with (e.g., toxicity) information about the ingredient, product scan service 130 analyzes the new product/ingredient data to identify one or more users (or mobile devices) that are associated with the bar code or ingredient in question. Product scan service 130 then sends, to each of the one or more identified mobile devices, information about the previously unknown product or ingredient. Such information may be "pushed" to the identified mobile device(s) or may be sent in response to a (e.g., periodic) request from the identified mobile device(s) for any updates.

In an embodiment, in response to a determination that product scan service 130 does not recognize a bar code, product scan service 130 sends, to the mobile application that transmitted the image data that represents the unknown bar code, prompt data that prompts a user of the mobile application to take a picture of an ingredients list that is listed elsewhere, such as on packaging of the product or on store shelf, rack, or accompanying display. Additionally or alternatively, product scan service 130 may prompt the user to take a picture of the name of the product and/or a maker of the product. Product scan service 130 may identify the correct product based on the brand and/or name of the product or based on the ingredients indicated in the ingredient list. Additionally or alternatively, the prompt data may prompt the user to enter (e.g., either via text or voice input) the names of the ingredients, which names are transmitted from mobile device 110 to product scan service 140. Product scan service 140 may have information about each individual ingredient found in the product (e.g., because the ingredients in the product are found in other products).

Notifications

In an embodiment, product scan service 130 sends notifications to multiple mobile devices based on one or more criteria. An example criterion is a previously unknown bar code being mapped to a known product. Another example criterion is change in ownership of a maker of a product. For example, a user scans a bar code of product X that is produced by maker A, which is owned by owner O. Later, the ownership of maker A changes such that owner P owns maker A instead of owner O. An administrator of product scan service 130 may cause, to be stored, data that identifies owner P as an entity that is known to allow their products to contain certain unsafe or toxic ingredients. In this way, when product scan service 130 determines that owner P owns a maker that produces one or more products, product scan service 130 sends notifications to mobile devices (or emails) for any users who have scanned (and, optionally, purchased, or otherwise indicated as owning) the one or more products. Thus, users of those products may make informed decisions regarding whether to continue using or purchasing those products.

Figure 9:
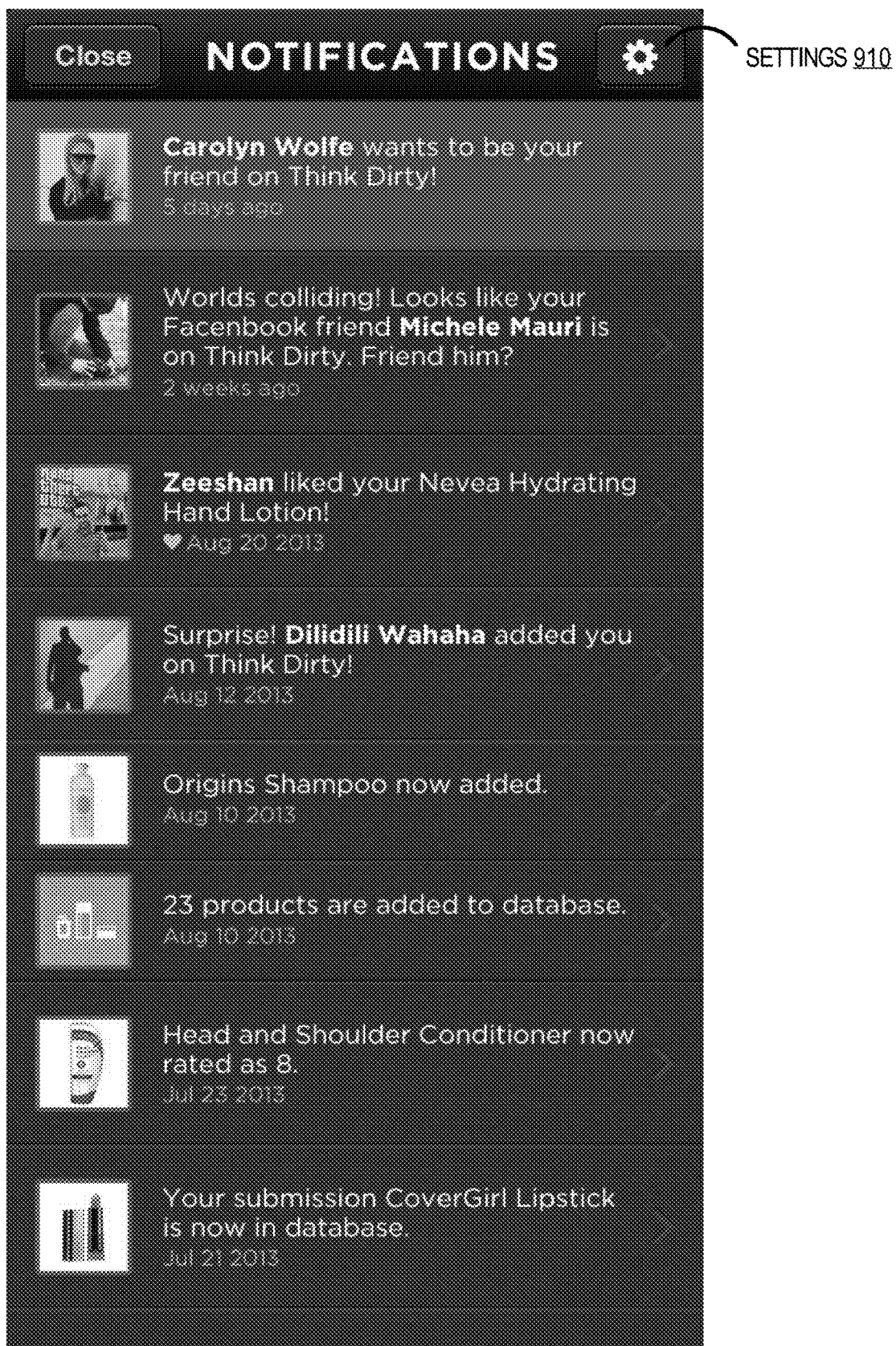
FIG. 9 is a screenshot of a display of different types of notifications that a scan service sends to a mobile device, in an embodiment.

FIG. 9 is a screenshot of a display of a notifications page that includes different types of notifications that product scan service sends to a mobile device, in an embodiment. The first (or top-most) notification in the notifications page is about another registered user of product scan service 130 indicating that she desires to be a friend of a particular user who operates the mobile device upon which the notifications page is displayed. User selection of the first notification may add the friend seeker (i.e., a "Carolyn Wolfe") to a friend list of the particular user. Also, user selection of the first notification may allow the friend seeker to view the "Bathroom Shelf" (if any) of the particular user (and, optionally, "like" products indicated in the "Shelf"), send messages through product scan service 130 to the mobile device of the particular user, and/or compete for badges with the particular user.

The second notification is about the user's friend through another social network service has joined or registered with product scan service 130 (referred to as "Think Dirty" in the notification). User selection of this notification may cause a friend request to be sent through product scan service 130 to a mobile device of the friend.

The third notification indicates that another registered user ("Zeeshan") has "liked" a product of the "Bathroom Shelf" of the particular user.

The fourth notification indicates that another registered user of product scan service 130 has added the user as a friend. Such an action may result in friend data of the other registered user being updated to identify the user.

The fifth notification indicates that a particular product (i.e., "Origins Shampoo") has been added to product database 140. Such a notification may be sent to all registered users of product scan service 130, to registered users who have purchased or scanned an Origins product, to registered users who have purchased or scanned a shampoo product, or to registered users who have requested information about the particular product before product scan service 130 had access to the information. User selection of the fifth notification may cause content similar to the content depicted in FIGS. 2A-2B to be displayed.

The sixth notification indicates that information about 23 products has been added to product database 140. User selection of this notification may cause a page to be displayed that lists the names of the 23 products.

The seventh notification indicates that a toxicity rating of a certain product (i.e., "Head and Shoulder Conditioner") has changed. For example, the toxicity rating of a product may be one rating when a mobile device scans the product and then, later on, a different rating.

As another example, the product may not have had a toxicity rating when the user scanned or purchased the product. In an embodiment, product scan service 130 maintains non-rating data that indicates (1) which products did not have toxicity ratings when the products were scanned or purchased and (2) which mobile devices scanned those products. When product scan service 130 determines a toxicity rating for a particular product indicated in the non-rating data, product scan service 130 uses the non-rating data to identify one or more mobile devices that have scanned the particular product or that are associated with users that have alleged to have purchased or used the particular product.

User selection of the seventh notification may cause additional information about the product, its ingredients, and/or what changed to cause the toxicity rating of the product to change (such as a toxicity rating of a previously unknown ingredient or a change in toxicity rating of a known ingredient) to be displayed.

The eighth notification indicates that information about a product (whose name or bar code the user has submitted to product scan service 130) is available in product database 140. Selection of this notification causes information about the product to be displayed, such as a display similar to the one in FIGS. 2A-2B.

The screenshot of FIG. 9 also includes a settings 910 button that, when selected, causes a notification settings page to be displayed on a mobile device.

Figure 10:
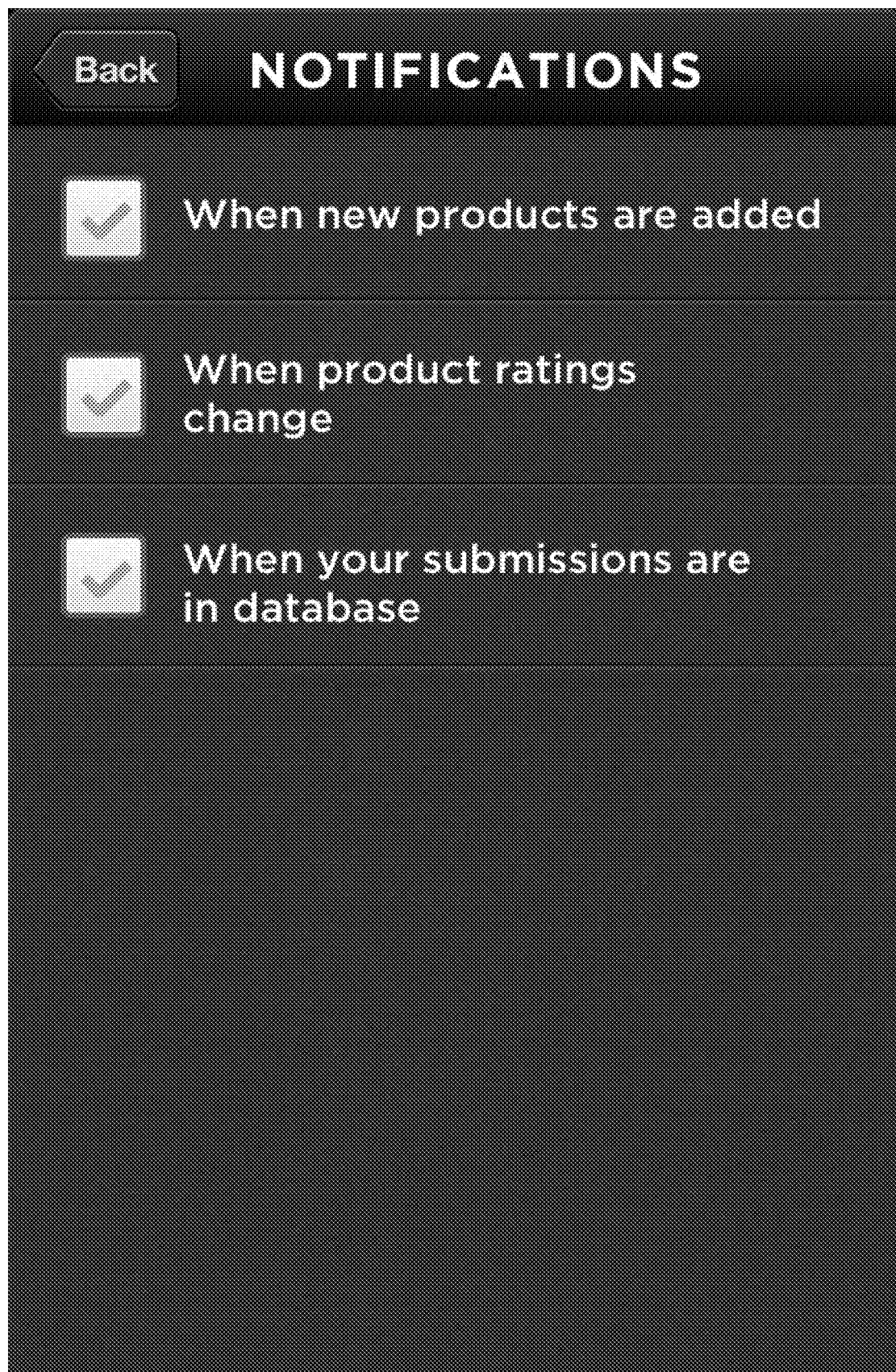
FIG. 10 is a screenshot of a display of a notification settings page that a user may modify, in an embodiment.

FIG. 10 is a screenshot of a display of a notification settings page that a user may modify, in an embodiment. The notification settings page includes three settings that, when selected, allows the corresponding types of notifications to be transmitted to the mobile device. The settings include: (1) a setting to be notified when a new product is added to product database 140; (2) a setting to be notified when a product rating (e.g., of a product that the mobile device has scanned previously or of a product that is in the user's "Bathroom Shelf") changes; and (3) a setting to be notified when the user's submission is added to product database 140. A notification corresponding to (1) may be different than a notification corresponding to (3). For example, for the latter notification, the notification may indicate that the user had previously submitted a request for information about the product that is part of the notification, whereas, for the former notification, the notification does not so indicate.

Personal Profile

In an embodiment, product scan service 130 stores personal information about multiple users and uses that information to warn the users about products or ingredients that the users should avoid using. Examples of personal information that a user can provide to product scan service (e.g., through mobile device 110) include age, height, weight, gender, ethnicity, known allergies, whether the user smokes and/or drinks alcohol, and known medical conditions, such as eczema, asthma, and a certain type of cancer. Such input may be provided through a mobile application or through a desktop computer that executes a client application or web browser that interacts with product scan service 130 or a client application that is configured to process personal data and provide information based on that personal data.

In an embodiment, product scan service 130 stores mapping data that associates ingredients (and/or products as a whole) with physical characteristics (e.g., age and gender) or conditions (e.g., eczema and asthma). Such mapping data indicates that users with certain characteristics or conditions should avoid certain ingredients or products. Thus, upon identifying personal characteristics or medical conditions of a user, product scan service 130 may use the mapping data to identify one or more products or ingredients to avoid.

Such an identification may be performed in response to receiving certain information. For example, product scan service 130 identifies a potentially dangerous product or ingredient in response to receiving, from a mobile device, image data that represents a bar code of a product or an ingredient list. As another example, an identification of potentially hazardous products or ingredients may be performed in response to receiving an update to a user's personal profile, such as an indication that the user has a particular medical condition. In this embodiment, product scan service 130 analyzes one or more products that are in the user's "Bathroom Shelf" or that the user has scanned previously.

After identifying a potentially dangerous or toxic product or ingredient, product scan service 130 sends, to a computing device, a notification that includes information about the product or ingredient. The notification may be selectable by a user of the computing device such that additional detail about the product or ingredient is provided to the computing device.

In an embodiment, product scan service 130 determines that a known product that has been scanned by multiple mobile devices and (presumably) used by multiple users includes a particular ingredient that was not previously known. If the particular ingredient is then discovered to be toxic or relatively unsafe to all users or only to certain users with certain characteristics or conditions, then product scan service 130 sends, to multiple computing devices (each corresponding to a different user), a notification that identifies the particular ingredient and/or a product (of the user) that includes the particular ingredient.

Ingredient-Centric Search

In an embodiment, product scan service 130 provides a search feature that allows users to search for products that satisfy one or more criteria. Examples of search criterion include a product category (e.g., "shampoo"), a brand name (e.g., "L'Oreal"), an ingredient (e.g., "hydrolyzed wheat protein"), and a safeness attribute or toxic rating (e.g., "<4").

The search feature may allow a user to specify Boolean logic for one or more search criteria. For example, a search query may be for a hand lotion product that is produced by maker A, does not include ingredient B, and has an overall toxicity rating of less than 5 on a toxicity scale. In response, product scan service 130 searches product database 140 for hand lotion products that satisfy the search criteria. As another example, a search query only specifies a particular ingredient that a product must include. In response, product scan service 130 searches product database 140 for any products that include the particular ingredient. The results of the search may include products from multiple product categories, such as shampoo, skin location, sunscreen, and make-up.

Expiration Dates

In an embodiment, product scan service 130 stores expiration information (for example, in product database 140) that indicates how long a product is good for until the product becomes toxic or loses some desirable qualities, such as a level of creaminess, scent, or effectiveness at achieving results that the product alleges come as a result of using the product. Expiration information for a product may come from the maker of the product, from a user of the product (e.g., via an image scan), or from a third-party source.

Product scan service 130 may provide expiration information to users in one of numerous situations. For example, product scan service 130 determines when a user has scanned a product and uses that date to presume a starting date for use of the product. As another example, a mobile device may have scanned a product many days after a user has purchased the product. The user then provides input that indicates when the user purchased the product or when the user began using the product.

In either case, product scan service 130 compares a use starting date or a purchase date of a product with expiration information associated with the product and determines, based on the comparison, whether the product has expired or is about to expire (e.g., in a month). If so, then product scan service 130 sends, to a mobile device associated with the product, a notification that the product has expired or is about to expire. Such a notification may identify the product's name, brand, purchase date, first use date, expiration date, and possible consequences if the product is still used after the expiration date.

Product scan service 130 may periodically, for each registered user, (1) identify which products that are allegedly owned or used by the registered user, (2) determine an expiration date for each product for which expiration information is available, and (3) notify the registered user if one or more of the user's products have expired or are about to expire.

Badges

In an embodiment, product scan service 130 maintains information about scanning (or purchasing) behavior of multiple users and uses that information to provide incentives to some of those users. "Scanning behavior" of a user refers to a number of product scans that the user has initiated with the user's mobile device. Purchasing behavior of a user refers to a number of products that the user has purchased. Scanning behavior may be for all product scans or certain product scans, such as:
  product scans that occurred during a certain time period (e.g., in the last month);
  product scans that occurred in a certain store;
  product scans for products of a particular brand or manufacturer, product scans for products of a particular category (e.g., skin lotion);
  product scans for products with certain safeness attributes or toxicity ratings (e.g., under '4'); or
  product scans for products that are considered "green" or safe for the environment.

A "badge" is a formal recognition by product scan service 130 that the user has exhibited exemplary scan (or purchase) behavior. A badge may be for a single user from the population of all registered users of product scan service 130. In other words, there can only be one badge for scanning the most products of all time. As another example, there can only be one badge for scanning the most products in a month from registering with product scan service 130 (or downloading mobile application 112). Alternatively, a badge may be for a single user from among a select group of users, such as users that are "friends" of the single user.

A badge is not permanent in that a user may earn a badge one day and lose that badge the next day. Thus, in order to maintain a badge, a user that has earned the badge may be incentivized to continue exhibiting the scanning behavior that caused the user to earn the badge. For example, if a first user has earned an eye make-up badge for scanning the most eye make-up products and a second user later scans one more eye make-up product than the first user, then the second user earns the eye make-up badge.

Figure 11:
FIG. 11 is a screenshot of a display on a screen of a mobile device, where the display indicates various badges that a user has "earned" based on the user's scanning history, in an embodiment.

FIG. 11 is a screenshot of a display on a screen of a mobile device, where the display indicates various badges that a user has "earned" based on the user's scanning behavior, in an embodiment. In this example, the screenshot is displayed in response to user selection of the "Badge" button 1110. The "Green to Green" badge may be earned by scanning (or purchasing) the most products that are considered "green" or safe for the environment in terms of how the product was made or how safe the product is after it enters the sewer system. The "Clean Queen" badge may be earned by scanning (or purchasing) the most cleaning products. The "Marvelous Mama" badge may be earned by scanning (or purchasing) the most baby products. The "Newbie Superhero" badge may be earned by scanning the most products within a certain period of time after registering with product scan service 130 (or downloading mobile application 112).

The "Newbie Superhero" badge may be a badge that, once lost, cannot be re-earned. For example, if a first user earns the "Newbie Superhero" badge, a certain time has elapsed since the first user registered with product scan service 130, and another "newbie" has scanned more products, then the first user can no longer earn the "Newbie Superhero" badge again.

Challenges

In an embodiment, sponsors register with product scan service 130 to send messages to registered mobile devices of product scan service 130 to incentivize certain user behavior. A sponsor may be a brand name owner, a merchant, a retailer, or a manufacturer. The messages that a sponsor desires to be viewed by users of product scan service 130 may include challenges. A challenge is a sponsor-initiated campaign to entice users to perform one or more actions with respect to certain products associated with the sponsor. The enticement may be in any form, such as a coupon, discount, or free sample.

For example, a challenge may be for users to scan a certain number of products from maker M in a particular day. The user who scans the most products made by maker M in that particular day will be awarded a 20% off coupon of the next purchase of a product from maker M.

As another example, a challenge may be for users to purchase a certain number of products that belong to brand B in a particular week. The user who purchases the most products that belong to brand B during that particular week will be rewarded with four discounted tickets to a certain amusement park.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
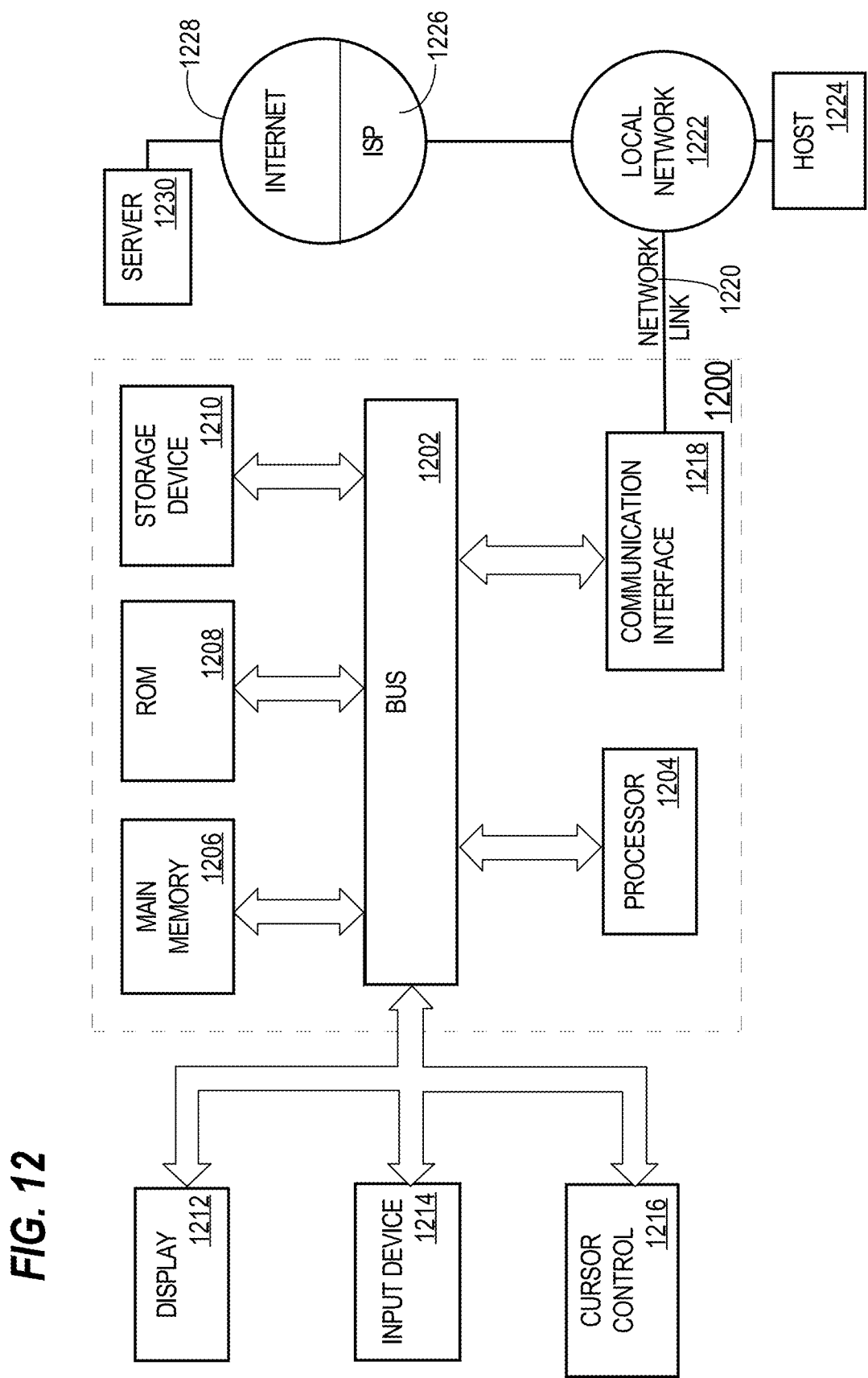
FIG. 12 is a block diagram that illustrates a computer system upon which an embodiment of the invention may be implemented.

For example, FIG. 12 is a block diagram that illustrates a computer system 1200 upon which an embodiment of the invention may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method comprising:
   identifying a digital image that is generated by a mobile device and that indicates a list of ingredients in an item;
   identifying, within the digital image, text that contains the list of ingredients;

determining whether a particular ingredient in the list of ingredients satisfies one or more criteria;

in response to determining that the particular ingredient satisfies the one or more criteria, modifying the digital image by causing a portion, of the text within the digital image, that corresponds to the particular ingredient, to be highlighted while the digital image is displayed on a screen of the mobile device;

wherein the method is performed by one or more computing devices.

2. The method of claim 1, further comprising:

determining a safeness attribute of the particular ingredient;

wherein the one or more criteria includes the safeness attribute being above a threshold.

3. The method of claim 1, wherein:

the particular ingredient is a first ingredient;

the portion of the text is a first portion of the text;

the method further comprising:

determining whether a second ingredient that is different than the first ingredient and that is in the list of ingredients satisfies the one or more criteria;

in response to determining that the second ingredient satisfies the one or more criteria, causing a second portion, of the text within the digital image, that corresponds to the second ingredient to be highlighted while the digital image is displayed on the screen of the mobile device.

4. The method of claim 3, wherein:

a first safeness attribute of the first ingredient is different than a second safeness attribute of the second ingredient;

the first portion, of the text, is highlighted differently than the second portion of the text based on the first safeness attribute being different than the second safeness attribute.

5. The method of claim 1, further comprising:

identifying a second portion of the digital image that does not include any ingredient in the list of ingredients;

causing the second portion to be darkened.

6. The method of claim 1, further comprising:

based on a toxicity rating of each ingredient of two or more ingredients in the list of ingredients, determining an overall rating for the item;

causing the overall rating to be displayed on the screen of the mobile device.

7. The method of claim 1, further comprising:

using optical character recognition to identify the text within in the digital image.

8. The method of claim 1, wherein the determining is performed by the mobile device.

9. The method of claim 1, further comprising:

sending, from the mobile device, to a remote server, the digital image or the list of ingredients;

wherein the determining is performed by the remote server.

10. A method comprising:

based on a digital image generated by a mobile device, determining a plurality of ingredients in an item;

for each ingredient of the plurality of ingredients, determining a toxicity metric of said each ingredient;

generating, based on each toxicity metric of the plurality of ingredients, a safeness rating of the item;

generating rating data based on the safeness rating;

causing the rating data to be displayed on a screen of the mobile device;

wherein the method is performed by one or more computing devices.

11. The method of claim 10, wherein generating the safeness rating comprises:

calculating an average toxicity metric based on the toxicity metric for each ingredient of the plurality of ingredients, wherein the safeness rating is based on the average toxicity metric; or identifying a highest toxicity metric from among toxicity metrics of the plurality of ingredients, wherein the safeness rating is based on the highest toxicity metric.

12. One or more storage media storing instructions which, when executed by one or more processors, cause performance of the method recited in claim 11.

13. The method of claim 10, wherein the determining is performed by the mobile device.

14. One or more storage media storing instructions which, when executed by one or more processors, cause performance of the method recited in claim 13.

15. The method of claim 10, further comprising:

sending, from the mobile device, to a remote server, the digital image or identification data that identifies the plurality of ingredients;

wherein the determining is performed by the remote server.

16. One or more storage media storing instructions which, when executed by one or more processors, cause performance of the method recited in claim 15.

17. One or more storage media storing instructions which, when executed by one or more processors, cause performance of the method recited in claim 10.

18. One or more non-transitory storage media storing instructions which, when executed by one or more processors, cause:

identifying a digital image that is generated by a mobile device and that indicates a list of ingredients in an item;

identifying, within the digital image, text that contains the list of ingredients;

determining whether a particular ingredient in the list of ingredients satisfies one or more criteria;

in response to determining that the particular ingredient satisfies the one or more criteria, modifying the digital image by causing a portion, of the text within the digital image, that corresponds to the particular ingredient, to be highlighted while the digital image is displayed on a screen of the mobile device.

19. The one or more storage media of claim 18, wherein the instructions, when executed by the one or more processors, further cause:

determining a safeness attribute of the particular ingredient;

wherein the one or more criteria includes the safeness attribute being above a threshold.

20. The one or more storage media of claim 18, wherein:

the particular ingredient is a first ingredient;

the portion of the text is a first portion of the text;

the instructions, when executed by the one or more processors, further cause:

determining whether a second ingredient that is different than the first ingredient and that is in the list of ingredients satisfies the one or more criteria;

in response to determining that the second ingredient satisfies the one or more criteria, causing a second portion, of the text within the digital image, that corresponds to the second ingredient to be highlighted while the digital image is displayed on the screen of the mobile device.

21. The one or more storage media of claim 20, wherein:
a first safeness attribute of the first ingredient is different than a second safeness attribute of the second ingredient;
the first portion, of the text, is highlighted differently than the second portion of the text based on the first safeness attribute being different than the second safeness attribute.

22. The one or more storage media of claim 18, wherein the instructions, when executed by the one or more processors, further cause:
identifying a second portion of the digital image that does not include any ingredient in the list of ingredients;
causing the second portion to be darkened.

23. The one or more storage media of claim 18, wherein the instructions, when executed by the one or more processors, further cause:
based on a toxicity rating of each ingredient of two or more ingredients in the list of ingredients, determining an overall rating for the item;
causing the overall rating to be displayed on the screen of the mobile device.

24. The one or more storage media of claim 18, wherein the instructions, when executed by the one or more processors, further cause:
using optical character recognition to identify the text within in the digital image.

25. The one or more storage media of claim 18, wherein the determining is performed by the mobile device.

26. The one or more storage media of claim 18, wherein the instructions, when executed by the one or more processors, further cause:
sending, from the mobile device, to a remote server, the digital image or the list of ingredients;
wherein the determining is performed by the remote server.

* * * * *